(12) United States Patent
Oz et al.

(10) Patent No.: US 8,631,488 B2
(45) Date of Patent: Jan. 14, 2014

(54) SYSTEMS AND METHODS FOR PROVIDING SECURITY SERVICES DURING POWER MANAGEMENT MODE

(75) Inventors: Ami Oz, Azur (IL); Shlomo Touboul, Kefar Haim (IL)

(73) Assignee: CUPP Computing AS, Bergen (NO)

( * ) Notice: Subject to any disclaimer, the term of this patent is extended or adjusted under 35 U.S.C. 154(b) by 656 days.

(21) Appl. No.: 12/535,650

(22) Filed: Aug. 4, 2009

(65) Prior Publication Data

US 2010/0037321 A1 Feb. 11, 2010

Related U.S. Application Data

(60) Provisional application No. 61/086,134, filed on Aug. 4, 2008.

(51) Int. Cl.
| | | |
|---|---|---|
| G06F 11/00 | (2006.01) | |
| G06F 12/14 | (2006.01) | |
| G06F 12/16 | (2006.01) | |
| G08B 23/00 | (2006.01) | |

(52) U.S. Cl.
USPC ............................................. 726/22; 726/23

(58) Field of Classification Search
USPC ...................................... 726/22, 23
See application file for complete search history.

(56) References Cited

U.S. PATENT DOCUMENTS

| | | |
|---|---|---|
| H1944 H | 2/2001 | Cheswick et al. |
| 6,466,779 B1 | 10/2002 | Moles et al. |
| 6,772,345 B1 | 8/2004 | Shetty |
| 6,813,682 B2 | 11/2004 | Bress et al. |
| 7,065,644 B2 | 6/2006 | Daniell et al. |
| 7,076,690 B1 | 7/2006 | Todd et al. |
| 7,086,089 B2 | 8/2006 | Hrastar et al. |
| 7,184,554 B2 | 2/2007 | Freese |
| 7,283,542 B2 | 10/2007 | Mitchell |
| 7,353,533 B2 | 4/2008 | Wright et al. |
| 7,359,983 B1 | 4/2008 | Maufer et al. |
| 7,360,242 B2 | 4/2008 | Syvänne |
| 7,418,253 B2 | 8/2008 | Kavanagh |

(Continued)

FOREIGN PATENT DOCUMENTS

| | | |
|---|---|---|
| WO | 2000078008 | 12/2000 |
| WO | 2004030308 | 4/2004 |

OTHER PUBLICATIONS

Breeden II, John et al., "A Hardware Firewall You Take With You," Government Computer News, located at http:/gcn.com/Articles/2005/06/01/A-hardware-firewall-you-take-with-you.aspx?p=1, Jun. 1, 2005.

(Continued)

*Primary Examiner* — Kambiz Zand
*Assistant Examiner* — Benjamin Kaplan
(74) *Attorney, Agent, or Firm* — Sheppard, Mullin, Richter & Hampton LLP

(57) ABSTRACT

Systems and methods for providing security services during a power management mode are disclosed. In some embodiments, a method comprises detecting a wake event, providing a wake signal in response to the wake event to wake a mobile device from a power management mode, and managing security services of the mobile device. Managing security services may comprise scanning a hard drive of the mobile devices for viruses and/or other malware. Managing security services may also comprise updating security applications or scanning the mobile device for unauthorized data.

20 Claims, 19 Drawing Sheets

(56) References Cited

U.S. PATENT DOCUMENTS

| | | | |
|---|---|---|---|
| 7,657,941 | B1 | 2/2010 | Zaitsev |
| 7,984,479 | B2 | 7/2011 | Brabson et al. |
| 7,992,199 | B1 | 8/2011 | Winick et al. |
| 8,321,934 | B1* | 11/2012 | Cooley et al. ............ 726/22 |
| 2003/0055994 | A1 | 3/2003 | Herrmann et al. |
| 2003/0070084 | A1 | 4/2003 | Satomaa et al. |
| 2003/0097431 | A1 | 5/2003 | Dill |
| 2003/0126468 | A1 | 7/2003 | Markham |
| 2003/0142683 | A1 | 7/2003 | Lam et al. |
| 2004/0003262 | A1 | 1/2004 | England et al. |
| 2004/0085944 | A1 | 5/2004 | Boehm |
| 2004/0093520 | A1 | 5/2004 | Lee et al. |
| 2004/0123153 | A1 | 6/2004 | Wright et al. |
| 2004/0177274 | A1 | 9/2004 | Aroya |
| 2004/0203296 | A1 | 10/2004 | Moreton et al. |
| 2004/0210775 | A1 | 10/2004 | Gbadegesin |
| 2004/0237079 | A1 | 11/2004 | Cox et al. |
| 2005/0114711 | A1 | 5/2005 | Hesselink et al. |
| 2005/0149757 | A1 | 7/2005 | Corbett et al. |
| 2005/0208967 | A1 | 9/2005 | Buniatyan |
| 2005/0254455 | A1 | 11/2005 | Plehn et al. |
| 2006/0037071 | A1 | 2/2006 | Rao et al. |
| 2006/0161985 | A1 | 7/2006 | Zhao |
| 2006/0224794 | A1 | 10/2006 | Stevens |
| 2006/0242686 | A1 | 10/2006 | Toda et al. |
| 2007/0005987 | A1 | 1/2007 | Durham et al. |
| 2007/0022474 | A1 | 1/2007 | Rowett et al. |
| 2007/0083939 | A1 | 4/2007 | Fruhauf et al. |
| 2007/0118874 | A1 | 5/2007 | Adams et al. |
| 2007/0118893 | A1 | 5/2007 | Crawford |
| 2007/0130457 | A1 | 6/2007 | Kamat et al. |
| 2007/0192500 | A1 | 8/2007 | Lum |
| 2007/0192854 | A1 | 8/2007 | Kelley et al. |
| 2007/0261112 | A1 | 11/2007 | Todd et al. |
| 2008/0083037 | A1 | 4/2008 | Kruse et al. |
| 2008/0098478 | A1 | 4/2008 | Vaidya et al. |
| 2008/0109871 | A1 | 5/2008 | Jacobs |
| 2008/0235755 | A1 | 9/2008 | Blaisdell et al. |
| 2008/0282337 | A1 | 11/2008 | Crawford |
| 2009/0249465 | A1* | 10/2009 | Touboul ............ 726/11 |
| 2009/0254993 | A1 | 10/2009 | Leone |
| 2010/0242109 | A1* | 9/2010 | Lee ............ 726/22 |
| 2010/0251369 | A1* | 9/2010 | Grant ............ 726/23 |
| 2010/0333088 | A1* | 12/2010 | Rogel et al. ............ 718/1 |
| 2011/0023118 | A1* | 1/2011 | Wright ............ 726/23 |
| 2011/0264931 | A1* | 10/2011 | Chang et al. ............ 713/310 |

OTHER PUBLICATIONS

CyberGuard Corporation, "Model 1: Wireless Mobile Security Appliance," located at http://support2.cyberguard.com/products/oem/model1.htm, 2005.

Entry, Inc., "CyberGuard Develops a Custom Mobile Security Appliance," SecurityProNews, located at http://www.securitypronews.com/news/securitynews/spn-45-20041007CyberGuardDevelo . . . , Oct. 7, 2004.

Kent, S. et al., "Security Architecture for the Internet Protocol," I.E.T.F. Network Working Group, RFC 4301, pp. 10-11, Dec. 2005.

PMC—Sierra, Inc., "MSP8120 Multi-Service Security Processor," Product Brief, 2007.

Prevelakis, Vassilis et al., "Drop-In Security for Distributed and Portable Computing Elements," Internet Research: Electronic Networking, Applications and Policy, vol. 13, No. 2, pp. 107-115, located at http://www.cs.columbia.edu/~angelos/Papers/InternetResearch-Final.pdf, 2003.

WatchGuard Technologies, Inc., "Mobile User VPN and PPTP," Internet Security Handbook, copyright 1998-2001, pp. 1-2, located at http://www.watchguard.com/help/Iss/41 /handbook/vpn3.htm, believe published Jun. 5, 2003.

ZyXEL Communications Corp., "ZyXEL Releases Worlds First Palm-Sized Portable Personal Firewall for Ultimate Security: ZyWALL P1 Pushes Network Security to the End-Point PC's with Minimum Administration Effort," ZyXEL News, located at http://global.zyxel.com/news/press.php?indexflag=20050310013432, Mar. 8, 2005.

European Patent Application No. 06821641.5, Search Report mailed Oct. 25, 2011.

European Patent Application No. 08847968.8, Search Report mailed Oct. 25, 2011.

International Application No. PCT/IL2006/001428, International Search Report and Written Opinion mailed Jul. 15, 2008.

International Application No. PCT/IL2008/000740, International Search Report and Written Opinion mailed Nov. 5, 2008.

International Application No. PCT/US2008/055942, International Search Report and Written Opinion mailed Apr. 6, 2009.

International Application No. PCT/US2009/065204, International Search Report and Written Opinion mailed Jan. 13, 2010.

\* cited by examiner

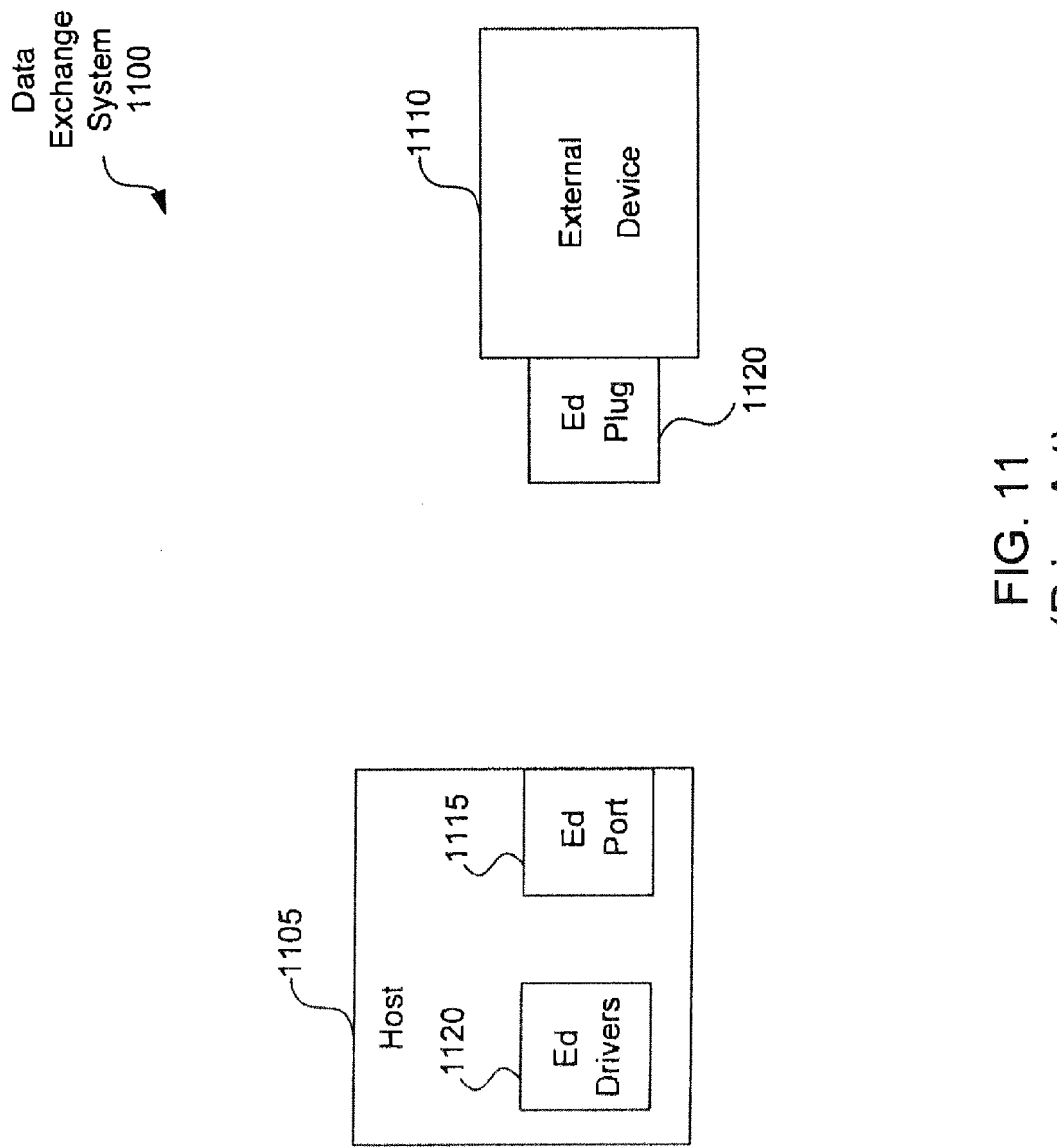

SYSTEMS AND METHODS FOR PROVIDING SECURITY SERVICES DURING POWER MANAGEMENT MODE

CROSS-REFERENCE

This application claims benefit of U.S. provisional patent application Ser. No. 61/086,134, entitled "System and Method for Providing Security Scan and Management to Hibernated Mobile Devices and PCs using a Mini Computer," filed Aug. 4, 2008, which is hereby incorporated by reference.

TECHNICAL FIELD

This invention relates generally to computer security, and more particularly provides a system and method for providing data and device security between external and host devices.

BACKGROUND

The internet is an interconnection of millions of individual computer networks owned by governments, universities, nonprofit groups, companies and individuals. While the internet is a great source of valuable information and entertainment, the internet has also become a major source of system damaging and system fatal application code, such as "viruses," "spyware," "adware," "worms," "Trojan horses," and other malicious code.

To protect users, programmers design computer and computer-network security systems for blocking malicious code from attacking both individual and network computers. On the most part, network security systems have been relatively successful. A computer that connects to the internet from within an enterprise's network typically has two lines of defense. The first line of defense includes a network security system, which may be part of the network gateway, that includes firewalls, anti-virus, antispyware and content filtering. The second line of defense includes individual security software on individual machines, which is not typically as secure as the network security system and is thus more vulnerable to attacks. In combination, the first and second lines of defense together provide pretty good security protection. However, when a device connects to the internet without the intervening network security system, the device loses its first line of defense. Thus, mobile devices (e.g., laptops, desktops, PDAs such as RIM's Blackberry, cell phones, any wireless device that connects to the internet, etc.) when traveling outside the enterprise network are more vulnerable to attacks.

FIG. 1 illustrates an example network system 100 of the prior art. Network system 100 includes a desktop 105 and a mobile device 110, each coupled to an enterprise's intranet 115. The intranet 115 is coupled via a network security system 120 (which may be a part of the enterprise's gateway) to the untrusted internet 130. Accordingly, the desktop 105 and mobile device 110 access the internet 130 via the network security system 120. A security administrator 125 typically manages the network security system 120 to assure that it includes the most current security protection and thus that the desktop 105 and mobile device 110 are protected from malicious code. Demarcation 135 divides the trusted enterprise 140 and the untrusted public internet 130. Because the desktop 105 and the mobile device 110 are connected to the internet 130 via the network security system 120, both have two lines of defense (namely, the network security system 120 and the security software resident on the device itself) against malicious code from the internet 130. Of course, although trusted, the intranet 115 can also be a source of malicious code.

FIG. 2 illustrates an example network system 200 of the prior art, when the mobile device 110 has traveled outside the trusted enterprise 140 and reconnected to the untrusted internet 130. This could occur perhaps when the user takes mobile device 110 on travel and connects to the internet 130 at a cybercafé, at a hotel, or via any untrusted wired or wireless connection. Accordingly, as shown, the mobile device 110 is no longer protected by the first line of defense (by the network security system 120) and thus has increased its risk of receiving malicious code. Further, by physically bringing the mobile device 110 back into the trusted enterprise 140 and reconnecting from within, the mobile device 110 risks transferring any malicious code received to the intranet 115.

As the number of mobile devices and the number of attacks grow, mobile security is becoming increasingly important. The problem was emphasized in the recent Info-Security Conference in New York on Dec. 7-8, 2005. However, no complete solutions were presented.

Similarly, when a host device is connected to an external device such as a USB flash drive, iPod, external hard drive, etc., both devices are vulnerable to receipt of malicious code or transfer of private data. FIG. 11 illustrates an example prior art data exchange system 1100 that includes a host computer (host) 1105 and an external device 1110. The host 1105 includes a external device (ED) port 1115, such as a USB port, for receiving the external device 1110. The host 1105 also includes ED drivers 1120 for performing enumeration and enabling communications between the external device 1110 and the host 1105. The external device 1110 includes an ED plug, such as a USB plug, for communicating with the ED port 1115. Both of the host 1105 and external device 1110 are vulnerable to receipt of malicious code or transfer of private data.

Accordingly, there is a need for a system and method of providing security to host and external devices.

Another disadvantage to existing security systems is that they require a fully operational system and a significant load on CPU power. To reduce the impact of scanning and updating a system, users often leave their PCs active overnight which consumes power. Further, when the PC is a laptop, the user cannot close the laptop and expect security functions to be performed.

SUMMARY

Per one embodiment, the present invention provides a security device comprising an external device plug operative to communicatively couple with a host; an external device port operative to communicatively couple with an external device; a processor; and memory storing an operating system, an external device driver operative to control communication with the external device, and a security engine operative to enforce a security policy on a data transfer request between the external device and the host. The security device may be operative with a driver on the host. At least one of the external device plug and the external device port may follow a USB standard. At least one of the external device plug and the external device port may include a wireless connection. The security engine may protect against the transfer of at least one of viruses, spyware and adware. The security engine may protect against the unauthorized transfer of private data.

Per one embodiment, the present invention provides a secure data exchange system, comprising a security device including a first external device plug, and a security engine operative to enforce a security policy on data transfer requests received from the host; an external device including a second external device plug; and a host including a first external device port operative to communicatively couple with the first external device plug, a second external device port operative to communicatively couple with the second external device plug, and a redirect driver operative to transfer a data transfer request from the host to the security device before executing the data transfer request. The external device may include a USB drive. The external device may include one of a PDA or a cell phone. The host may include one of a laptop, desktop, PDA or cell phone. The host may launch the redirect driver upon detecting connection of the secure device to the host.

Per one embodiment, the present invention may provide a method comprising communicatively coupling a security device to a host; communicatively coupling an external device to the security device; receiving by the security device a data transfer request from the host; and enforcing by the security device a security policy on the data transfer request before allowing the data transfer request to be performed. The communicatively coupling a security device to a host may include using a wired or wireless connection. The communicatively coupling an external device to the host may include using a wired or wireless connection. The data transfer request may include a request to transfer data from the host to the external device. The data transfer request may include a request to transfer data from the external device to the host. The enforcing may include reviewing the data being transferred for at least one of viruses, spyware and adware. The enforcing may include determining whether the data transfer request includes a request for private data. The enforcing may include requiring an additional security check before allowing the transfer of private data.

Per one embodiment, the present invention provides a method, comprising communicatively coupling a security device to a host; communicatively coupling an external device to the host; receiving by the host a data transfer request; using a redirect driver on the host to redirect the data transfer request to the security device; and enforcing by the security device a security policy on the data transfer request before allowing the data transfer request to be performed. The communicatively coupling a security device to a host may include using a wired or wireless connection. The communicatively coupling an external device to the host may include using a wired or wireless connection. The data transfer request may include a request to transfer data from the host to the external device. The data transfer request may include a request to transfer data from the external device to the host. The enforcing may include reviewing the data being transferred for at least one of viruses, spyware and adware. The enforcing may include determining whether the data transfer request includes a request for private data. The enforcing may include requiring an additional security check before allowing the transfer of private data.

Systems and methods for providing security services during a power management mode are disclosed. In some embodiments, a method comprises detecting a wake event, providing a wake signal in response to the wake event to wake a mobile device from a power management mode, and managing security services of the mobile device. Managing security services may comprise scanning a hard drive of the mobile devices for viruses and/or other malware. Managing security services may also comprise updating security applications or scanning the mobile device for unauthorized data. Scanning the mobile device for unauthorized data may comprise scanning the mobile device for unauthorized data based on a security policy.

The wake event may comprise the expiration of a predetermined period of time, a specific time of day, or receiving data from over a network.

In some embodiments, a mobile security system comprises a connection mechanism, and a security engine. The connection mechanism may be configured to connect to a data port of a mobile device and for communicating with the mobile device. The security engine may be configured to detect a wake event, provide a wake signal in response to the wake event to wake a mobile device from a power management mode, and manage security services of the mobile device.

An exemplary computer readable medium may store executable instructions. The instructions may be executable by a processor for performing a method. The method may comprise detecting a wake event, providing a wake signal in response to the wake event to wake a mobile device from a power management mode, and managing security services of the mobile device.

BRIEF DESCRIPTION OF THE DRAWINGS

FIG. 11 is a block diagram illustrating a prior art data exchange system.

DETAILED DESCRIPTION

The following description is provided to enable any person skilled in the art to make and use the invention, and is provided in the context of a particular application and its requirements. Various modifications to the embodiments may be possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

An embodiment of the present invention uses a small piece of hardware that connects to a mobile device and filters out attacks and malicious code. The piece of hardware may be referred to as a "mobile security system" or "personal security appliance." Using the mobile security system, a mobile device can be protected by greater security and possibly by the same level of security offered by its associated corporation/enterprise.

Figure 1:
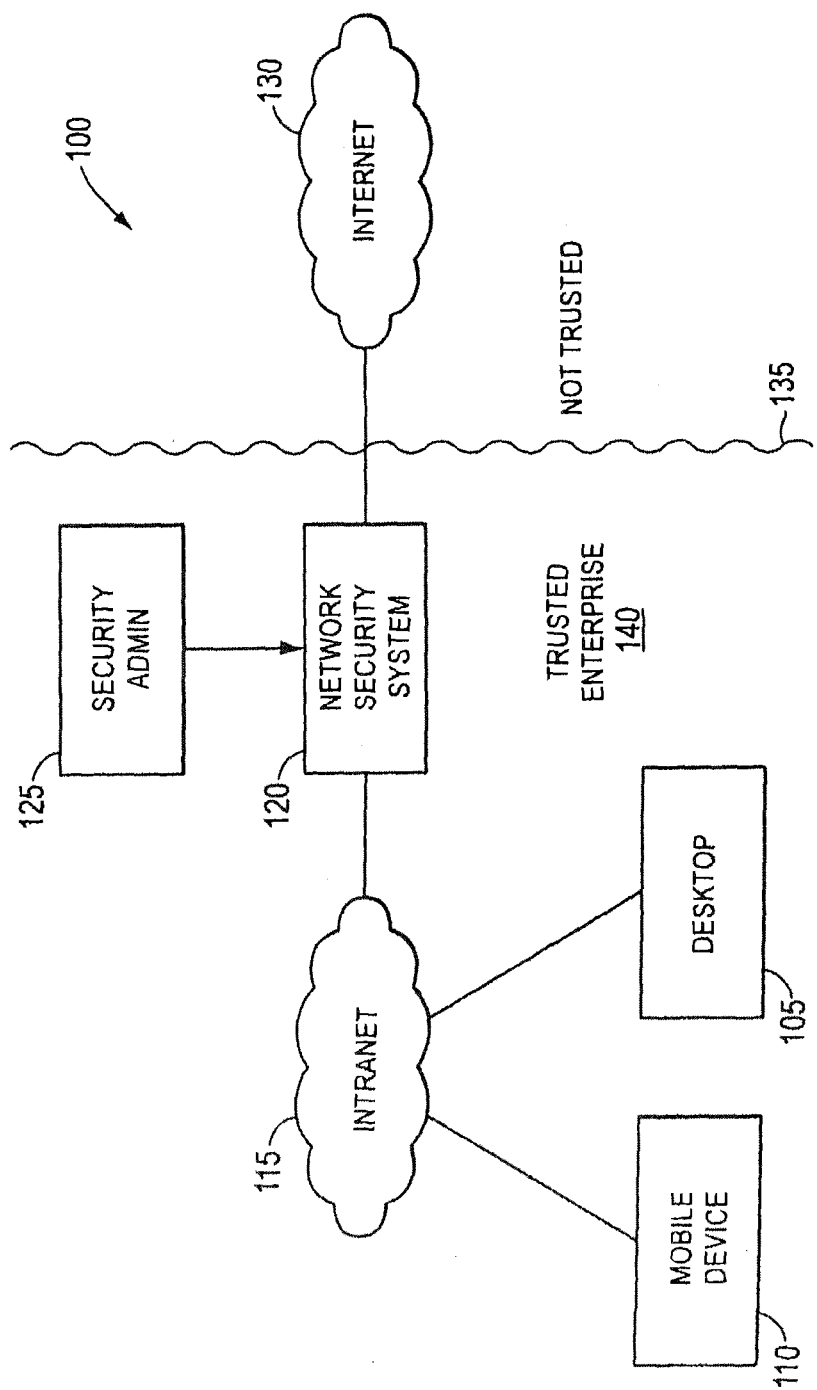
FIG. 1 is a block diagram of a prior art network system in a first state.
Figure 2:
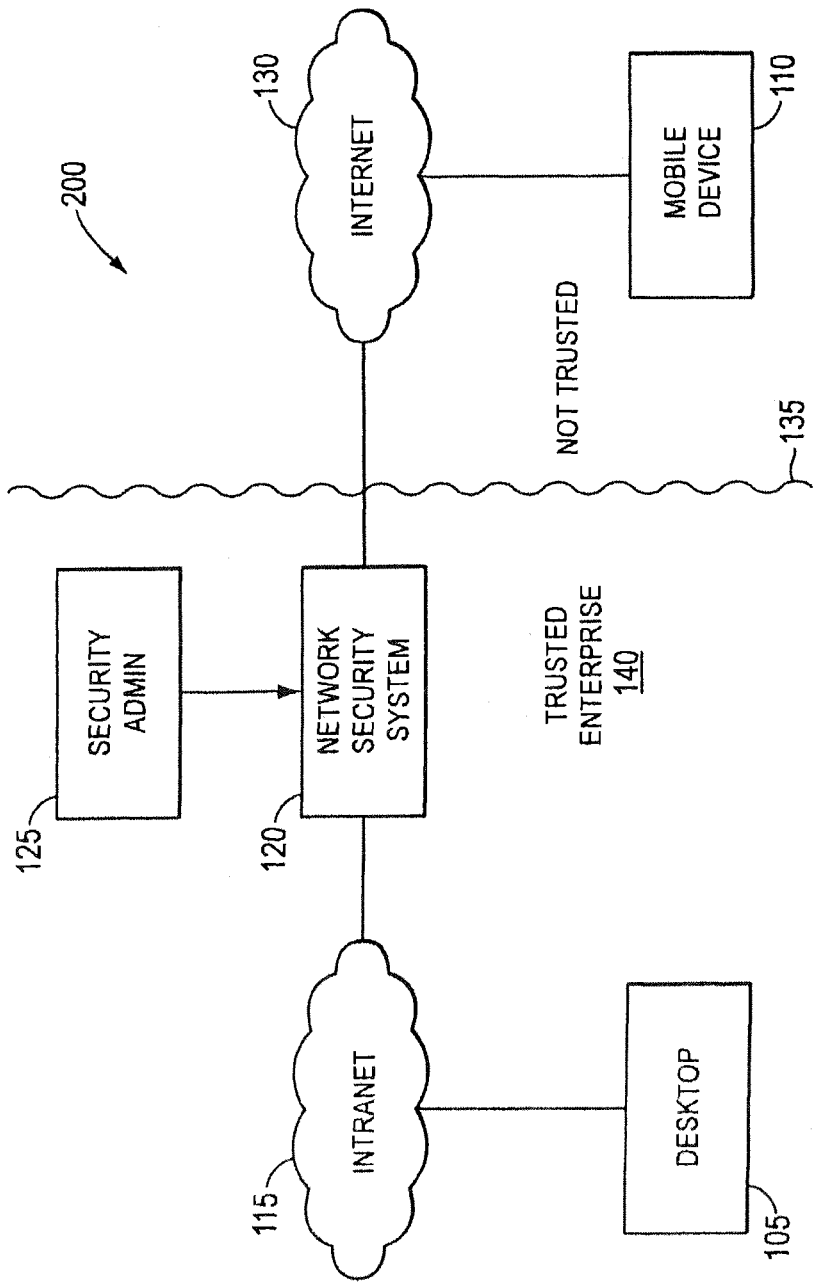
FIG. 2 is a block diagram of a prior art network system in a second state.
Figure 3:
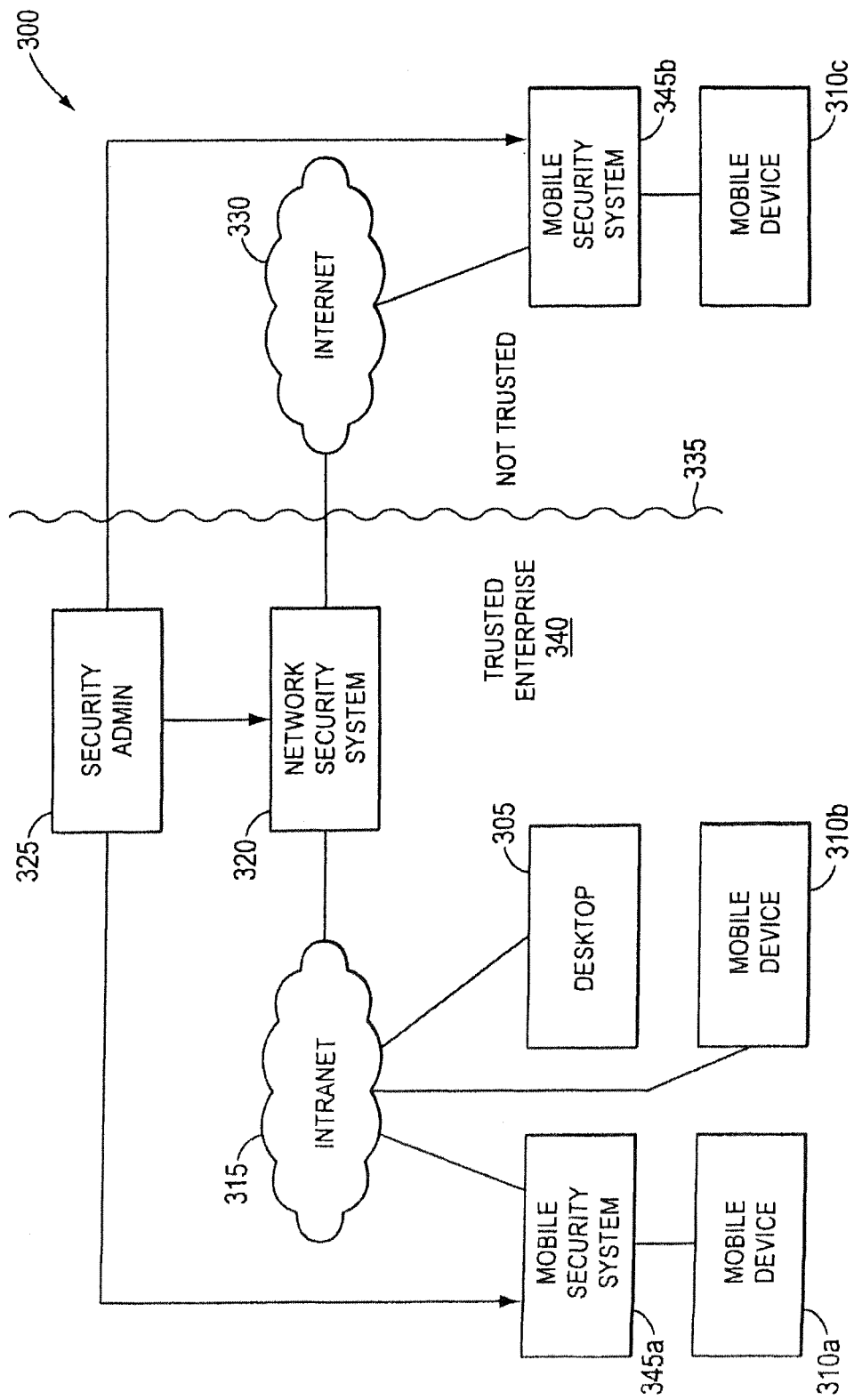
FIG. 3 is a block diagram of a network system in accordance with an embodiment of the present invention.

FIG. 3 illustrates a network system 300 in accordance with an embodiment of the present invention. Network system 300 includes a desktop 305, a first mobile device 310a, and a second mobile device 310b. The first mobile device 310a is illustrated as within the enterprise network 340 at this time and is coupled via a mobile security system 345a to the enterprise's intranet 315. The desktop 305 and second mobile device 310b are also within the enterprise network 340 but in this embodiment are coupled to the intranet 315 without an intervening mobile security system 345 such as mobile security system 345b. The intranet 315 is coupled via a network security system 320 (which may be part of the enterprise's gateway) to the untrusted internet 330. Accordingly, the first mobile device 310a, the second mobile device 310b and the desktop 305 access the untrusted internet 330 via the network security system 320. Each may also be protected by a personal security system resident thereon (not shown). A third mobile device 310c is currently outside the enterprise network 340 and is coupled via a mobile security system 345b to the untrusted internet 330. The third mobile device 310 may be in use by an employee of the trusted enterprise 340 who is currently on travel. A security administrator 325 manages the mobile security system 345a, the mobile security system 345b, and the network security system 320 to assure that they include the most current security protection. One skilled in the art will recognize that the same security administrator need not manage the various devices. Further, the security administrator could be the user and need not be within the trusted enterprise 340.

Demarcation 335 divides the trusted enterprise 340 and the untrusted publicly accessible internet 330. Each of mobile device 310a, 310b and 310c may be referred to generically as mobile device 310, although they need not be identical. Each mobile security system 345a and 345b may be referred to generically as mobile security system 345, although they need not be identical.

As shown, although the mobile device 310c has traveled outside the trusted enterprise 340, the mobile device 310c connects to the untrusted internet 330 via the mobile security system 345b and thus retains two lines of defense (namely, the mobile security system 345b and the security software resident on the device itself). In this embodiment, the mobile security system 345 effectively acts as a mobile internet gateway on behalf of the mobile device 310c. In an embodiment, the mobile security system 345 may be a device dedicated to network security. In an embodiment, each mobile security system 345 may support multiple mobile devices 310, and possibly only registered mobile devices 310, e.g., those belonging to enterprise 340.

Each mobile security system 345 (e.g., 345a, 345b) may be a miniature server, based on commercial hardware (with Intel's Xscale as the core), Linux OS and network services, and open-source firewall, IDS/IPS and anti-virus protection. The mobile security system 345 may be based on a hardened embedded Linux 2.6.

In this embodiment, because the security administrator 325 is capable of remotely communicating with the mobile security system 345b, IT can monitor and/or update the security policies/data/engines implemented on the mobile security system 345b. The security administrator 325 can centrally manage all enterprise devices, remotely or directly. Further, the security administrator 325 and mobile security systems 345 can interact to automatically translate enterprise security policies into mobile security policies and configure mobile security systems 345 accordingly. Because the mobile security system 345 may be generated from the relevant security policies of the enterprise 340, the mobile device 310c currently traveling may have the same level of protection as the devices 305/310 within the trusted enterprise 340.

Figure 8:
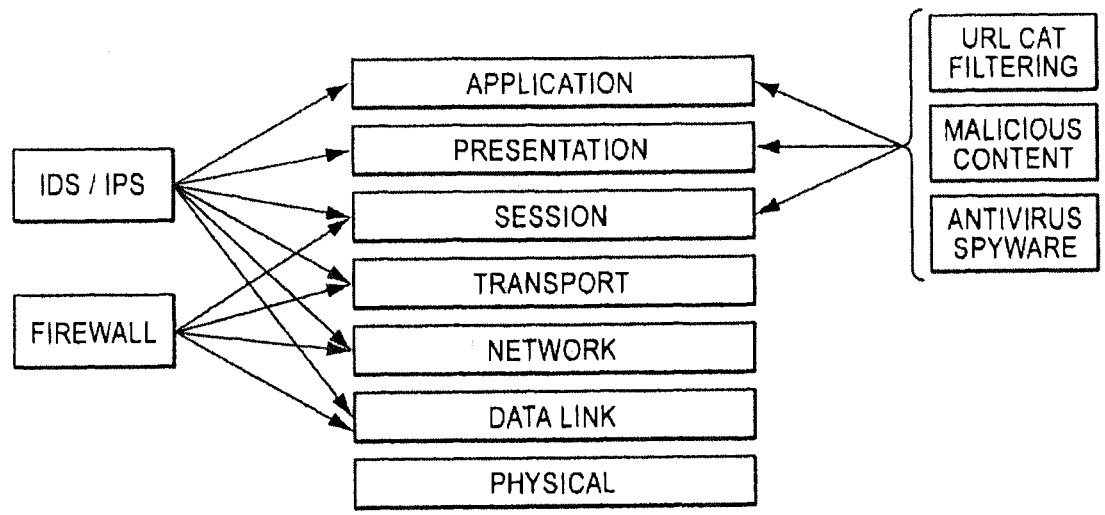
FIG. 8 is a block diagram illustrating details of network security measures relative to the OSI layers.

The mobile security system 345 may be designed as an add-on to existing software security or to replace all security hardware and software on a traveling mobile device. These security applications will preferably operate on different OSI layers to provide maximum security and malicious code detection, as shown in the example system illustrated in FIG. 8. Operating on the lower OSI layers and doing TCP/IP packets analysis only (by screening firewall or router packets) would miss virus and/or worm behavior. Also, many modern viruses use mobile code implemented on a "higher" level than the $7^{th}$ OSI layer (Application—HTTP, FTP, etc.) and therefore cannot be interpreted at the packet layer nor at the application layer. For example, applying anti-virus analysis only at the session or transport layer on a malicious Java Script (that is included in an HTML page), trying to match the signature with packets and without understanding the content type (Java Script), will not detect the malicious nature of the Java Script. To offer greater protection, the mobile security system 345 may act as corporate class security appliance and engage different security applications based on the content type and the appropriate OSI layers, (or even a "higher" level if content is encapsulated in the application layer). The mobile security system 345 may be configured to perform content analysis at different OSI layers, e.g., from the packet level to the application level. It will be appreciated that performing deep inspection at the application level is critical to detect malicious content behavior and improve detection of viruses, worms, spyware, Trojan horses, etc. The following software packages may be implemented on the mobile security system 345:

Firewall and VPN—including stateful and stateless firewalls, NAT, packet filtering and manipulation, DOS/DDOS, netfilter, isolate user mobile devices from the internet and run VPN program on the device, etc.

Optional web accelerator and bandwidth/cache management based on Squid.

IDS/IPS—Intrusion detection and prevention system based on Snort. Snort is an open source network intrusion prevention and detection system utilizing a rule-driven language, which combines the benefits of signature, protocol- and anomaly-based inspections.

Anti-virus and antispyware based on ClamAV; additional AV and AS engines, e.g., McAfee, Kaspersky, Pandamay, may be offered for additional subscription fees.

Malicious Content Detection—on the fly heuristics that perform content analysis to detect malicious content before having signatures. This will be based on a rule base and updated rules and will be content dependent scanning.

URL Categorization Filtering—based on a commercial engine, such as Surfcontrol, Smart Filters or Websense. May provide around 70 categories of URLs such as gambling, adult content, news, webmail, etc. The mobile device 345 may apply different security policies based on the URL category, e.g., higher restriction and heuristics for Gambling or Adult content web sites, etc.

Figure 4:
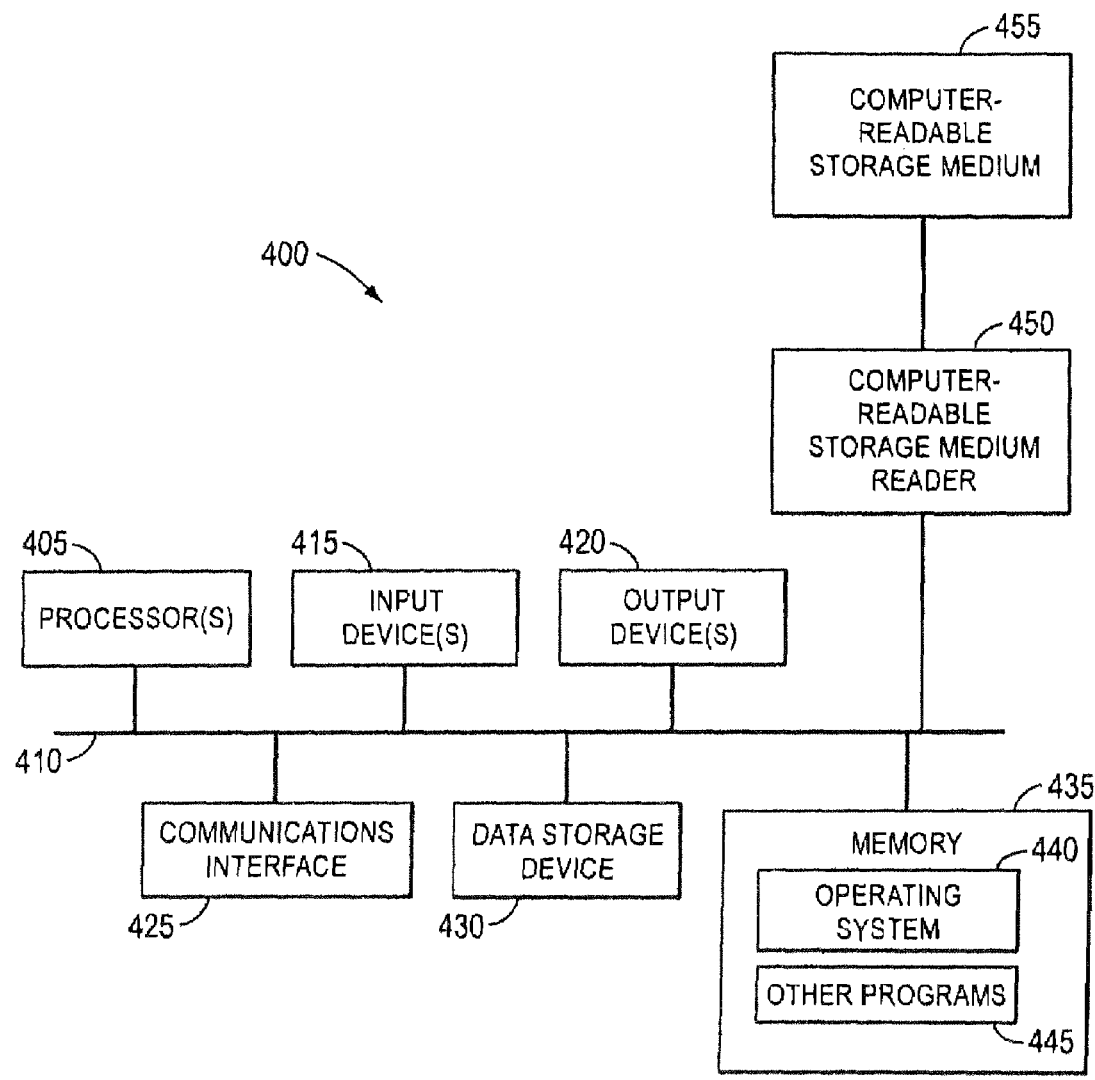
FIG. 4 is a block diagram illustrating details of a computer system in accordance with an embodiment of the present invention.

FIG. 4 is a block diagram illustrating details of an example computer system 400, of which each desktop 305, mobile device 310, network security system 320, mobile security system 345, and security administrator 325 may be an instance. Computer system 400 includes a processor 405, such as an Intel Pentium® microprocessor or a Motorola Power PC® microprocessor, coupled to a communications channel 410. The computer system 400 further includes an input device 415 such as a keyboard or mouse, an output device 420 such as a cathode ray tube display, a communications device 425, a data storage device 430 such as a magnetic disk, and memory 435 such as Random-Access Memory (RAM), each coupled to the communications channel 410. The communications interface 425 may be coupled directly or via a mobile security system 345 to a network such as the internet. One skilled in the art will recognize that, although the data storage device 430 and memory 435 are illustrated as different units, the data storage device 430 and memory 435 can be parts of the same unit, distributed units, virtual memory, etc.

The data storage device 430 and/or memory 435 may store an operating system 440 such as the Microsoft Windows XP, the IBM OS/2 operating system, the MAC OS, UNIX OS, LINUX OS and/or other programs 445. It will be appreciated that a preferred embodiment may also be implemented on platforms and operating systems other than those mentioned. An embodiment may be written using JAVA, C, and/or C++ language, or other programming languages, possibly using object oriented programming methodology.

One skilled in the art will recognize that the computer system 400 may also include additional information, such as network connections, additional memory, additional processors, LANs, input/output lines for transferring information across a hardware channel, the internet or an intranet, etc. One skilled in the art will also recognize that the programs and data may be received by and stored in the system in alternative ways. For example, a computer-readable storage medium (CRSM) reader 450 such as a magnetic disk drive, hard disk drive, magneto-optical reader, CPU, etc. may be coupled to the communications bus 410 for reading a computer-readable storage medium (CRSM) 455 such as a magnetic disk, a hard disk, a magneto-optical disk, RAM, etc. Accordingly, the computer system 400 may receive programs and/or data via the CRSM reader 450. Further, it will be appreciated that the term "memory" herein is intended to cover all data storage media whether permanent or temporary.

Figure 5:
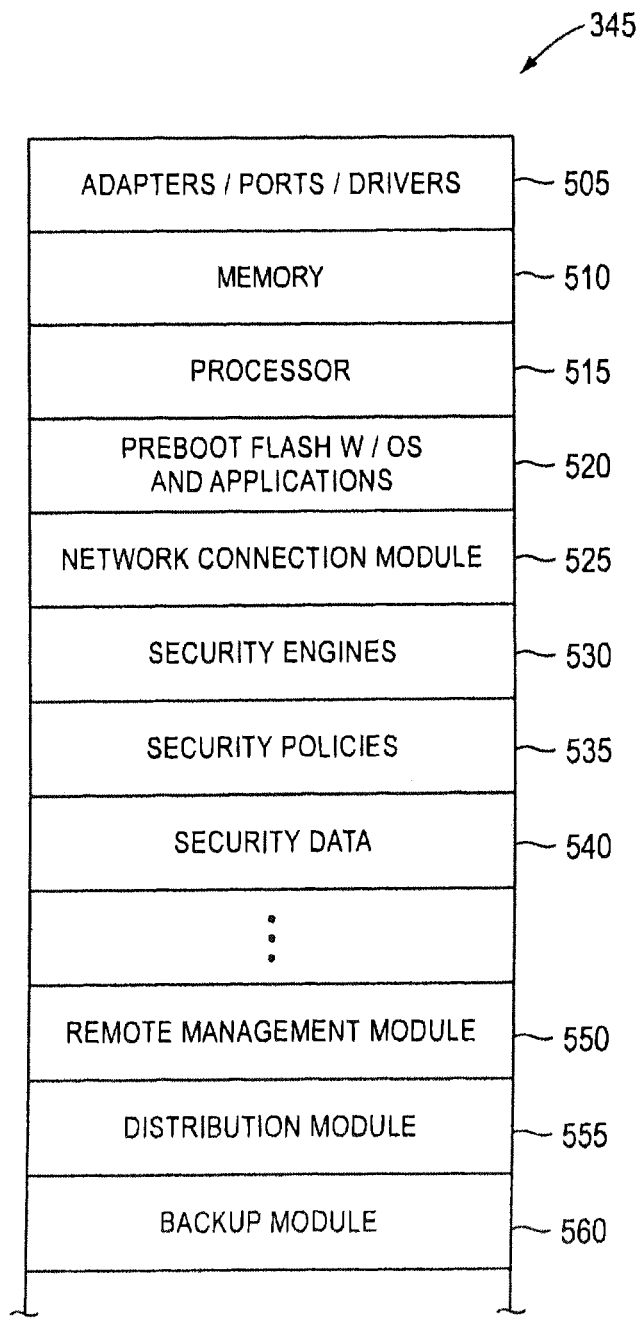
FIG. 5 is a block diagram illustrating details of the mobile security system in accordance with an embodiment of the present invention.

FIG. 5 is a block diagram illustrating details of the mobile security system 345 in accordance with an embodiment of the present invention. Mobile security system 345 includes adapters/ports/drivers 505, memory 510, a processor 515, a preboot flash/ROM memory module 520 storing a secure version of the mobile security system's operating system and other applications, network connection module 525, security engines 530, security policies 535, security data 540, remote management module 550, distribution module 555, and backup module 560. Although these modules are illustrated as within the mobile security system 345, one skilled in the art will recognize that many of them could be located elsewhere, e.g., on the security administrator 325 or on third-party systems in communication with the mobile security system 345. The mobile security system 345 may be in a pocket-size, handheld-size or key-chain size housing, or possibly smaller. Further, the mobile security system 345 may be incorporated within the mobile device 310.

The adapters/ports/drivers 505 include connection mechanisms (including software, e.g., drivers) for USB, Ethernet, WiFi, WiMAX, GSM, CDMA, BlueTooth, PCMCIA and/or other connection data ports on the mobile security system 345. In one embodiment, the adapters/ports/drivers 505 may be capable of connection to multiple devices 310 to provide network security to the multiple devices 310.

Memory 510 and processor 515 execute the operating system and applications on the mobile security system 345. In this example, the preboot flash 520 stores the operating system and applications. At boot time, the operating system and applications are loaded from the preboot flash 520 into memory 510 for execution. Since the operating system and applications are stored in the preboot flash 520, which cannot be accessed during runtime by the user, the operating system and applications in the preboot flash 520 are not corruptible. Should the copy of the operating system and applications in memory 510 be corrupted, e.g., by malicious code, the operating system and applications may be reloaded into the memory 510 from the preboot flash 520, e.g., upon restart. Although described as stored within the preboot flash 520, the OS and applications can be securely stored within other read-only memory devices, such as ROM, PROM, EEPROM, etc.

Memory (including memory 510 and preboot flash 520) on the mobile security system 345 may be divided into zones as follows:

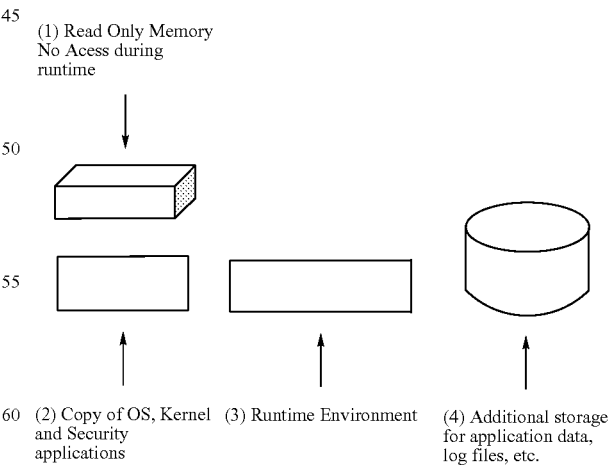

(1) Read Only Memory
No Acess during runtime (2) Copy of OS, Kernel and Security applications (3) Runtime Environment (4) Additional storage for application data, log files, etc.

Upon each "hard" restart, the boot loader (resident at area 1) of the mobile security system 345 copies the kernel and security applications (a fresh unchanged copy) from area 1 to 2. This causes a clean version of the OS and applications to be loaded into area 2 each time. That way, if a special mobile security system 345 attack is developed, the attack will be unable to infect the system, since the OS and applications are precluded from accessing memory area 1 during runtime. Further, any attack that does reach memory 510 will be able to run only once and will disappear upon a hard restart. A triggering mechanism may be available to restart the mobile security system 345 automatically upon infection detection.

The network connection module 525 enables network connection, e.g., to the internet 330 or the intranet 315 via network communication hardware/software including WiFi, WiMAX, CDMA, GSM, GPRS, Ethernet, modem, etc. For example, if the mobile device 310 wishes to connect to the internet 330 via a WiFi connection, the adapters/ports/drivers 505 may be connected to the PCI port, USB port or PCMCIA port of the mobile device 310, and the network connection module 525 of the mobile security system 345 may include a WiFi network interface card for connecting to wireless access points. Using the network connection module 425, the mobile security system 345 may communicate with the network as a secure gateway for the mobile device 310. Other connection architectures are described in FIGS. 10A-10C.

The security engines 530 execute security programs based on the security policies 535 and on security data 540, both of which may be developed by IT managers. Security engines 530 may include firewalls, VPN, IPS/IDS, anti-virus, antispyware, malicious content filtering, multilayered security monitors, Java and bytecode monitors, etc. Each security engine 530 may have dedicated security policies 535 and security data 540 to indicate which procedures, content, URLs, system calls, etc. the engines 530 may or may not allow. The security engines 530, security policies 535 and security data 540 may be the same as, a subset of, and/or developed from the engines, policies and data on the network security system 320.

To provide a higher security level provided by anti-virus and antispyware software, the security engines 530 on each mobile security system 345 may implement content analysis and risk assessment algorithms. Operating for example at OSI Layer 7 and above (mobile code encapsulated within Layer 7), these algorithms may be executed by dedicated High Risk Content Filtering (HRCF) that can be controlled by a rules engine and rule updates. The HRCF will be based on a powerful detection library that can perform deep content analysis to verify real content types. This is because many attacks are hidden within wrong mime types and/or may use sophisticated tricks to present a text file type to a dangerous active script or ActiveX content type. The HRCF may integrate with a URL categorization security engine 530 for automatic rule adjustment based on the URL category. In one embodiment, when the risk level increases (using the described mechanism) the mobile security system 345 may automatically adjust and increase filtering to remove more active content from the traffic. For example, if greater risk is determined, every piece of mobile code, e.g., Java script, VB script, etc. may be stripped out.

Three aspects for integration with corporate policy server legacy systems include rules, LDAP and active directory, and logging and reporting as discussed below. In one embodiment, a policy import agent running on the security administrator 325 will access the rule base of Checkpoint Firewall-1 and Cisco PIX Firewalls and import them into a local copy. A rule analysis module will process the important rules and will offer out-of-the-box rules and policies for mobile security systems 345. This proposed policy will offer all mobile security systems 345 a best fit of rules that conform the firewall policy of the enterprise 340. The agent will run periodically to reflect any changes and generate updates for mobile security system 345 policies 535. The LDAP and Active Directory may be integrated with the directory service to maintain mobile security system 345 security policies 535 that respond to the enterprise's directory definitions. For example, a corporate policy for LDAP user Group "G" may automatically propagate to all mobile security systems 345 in "G" group. Mobile security system 345 local logs and audit trails may be sent in accordance to a logging and reporting policy to a central log stored at the security administrator 325. Using a web interface, IT may be able to generate reports and audit views related to all mobile device 310 users, their internet experiences, and attempts to bring infected devices back to the enterprise 340. IT will be able to forward events and log records into legacy management systems via SYSLOG and SNMP Traps.

The security engines 530 may perform weighted risk analysis. For example, the security engine 530 may analyze HTTP, FTP, SMTP, POP3, IM, P2P, etc. including any traffic arriving from the internet 330. The security engine 530 may assign a weight and rank for every object based on its type, complexity, richness in abilities, source of the object, etc. The security engine 530 may assign weight based on the source using a list of known dangerous or known safe sources. The security engine 530 may assign weight to objects based on the category of the source, e.g., a gambling source, an adult content source, a news source, a reputable company source, a banking source, etc. The security engine 530 may calculate the weight, and based on the result determine whether to allow or disallow access to the content, the script to run, the system modification to occur, etc. The security engine 530 may "learn" user content (by analyzing for a predetermined period of time the general content that the user accesses) and accordingly may create personal content profiles. The personal content profile may be used to calibrate the weight assigned to content during runtime analysis to improve accuracy and tailor weighted risk analysis for specific user characteristics.

In some embodiments, the security engines 530, security policies 535 and security data 540 may enable bypassing the mobile security system 345. The security policy 535, set by the security administrator 325, may include a special attribute to force network connection through the mobile security system 325 when outside the trusted enterprise 340. Thus, if this attribute is set "on," when a mobile device 310 attempts to connect to the internet 330 without the mobile security system 345 and not from within the trusted enterprise 340, all data transfer connections including LAN connection, USB-net, modem, Bluetooth, WiFi, etc. may be closed. The mobile device 310 may be totally isolated and unable to connect to any network, including the internet 330.

Figure 6:
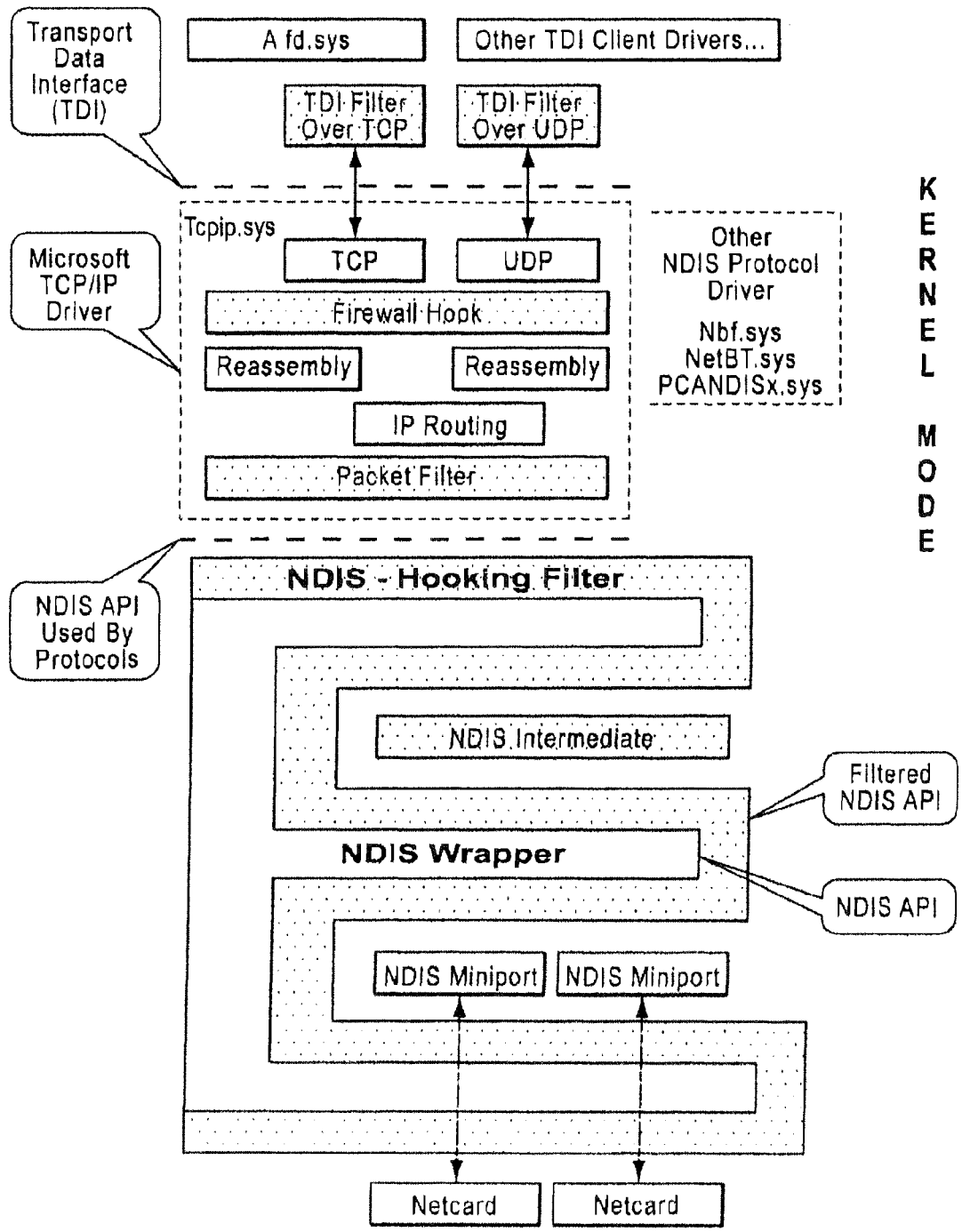
FIG. 6 is a block diagram illustrating details of the mobile security system in accordance with a Microsoft Window's embodiment.

In one embodiment, to enable this, when first connecting the mobile security system 345 to the mobile device 310 using for example the USB cable (for both power and USB connection creation), the USB plug & play device driver will be sent into the mobile device 310. The installed driver may be "Linux.inf" which allows a USB-net connection for the mobile security system 345. This connection allows the mobile security system 345 to access the internet 330 via the USB port and using the mobile device 310 network connection plus additional code ("the connection client"). In a Windows example, the connection client may be installed at the NDIS level of the mobile device 310 above all the network interface cards of every network connection as shown in FIG. 6. The implementation will be as an NDIS Intermediate (IM) Driver or NDIS-Hooking Filter Driver. Both implementations may be at the kernel level, so that an end user cannot stop or remove it. When starting the mobile device 310, the connection client may attempt to connect to the security administrator 325 or the network security system 320 locally within the trusted enterprise 340. If the node is not found (finding via VPN is considered as not found in local LAN), the connection client will assume it is working from outside the trusted enterprise 340 and expects to find the mobile security system 345 connected, e.g., via USB-net or other connection mechanism. If the mobile security system 345 is not found, the connection client may avoid any communication to any network connection. By a policy definition, this behavior can be modified to allow communication to the enterprise 340 via VPN installed in the mobile device 310. Similarly, in case of a mobile device system 345 failure, all traffic may be disabled, except for the VPN connection into the enterprise 340.

It will be appreciated that NDIS is one possible implementation of intercepting traffic at the kernel level. For example, in another embodiment, the system may hook Winsock or apply other ways that may be in future Windows versions.

In an embodiment where the mobile security system 345 supports multiple mobile devices 310, the security engines 530, security policies 535 and security data 540 may be different for each mobile device 310 (e.g., based on for example user preferences or IT decision). Alternatively, it can apply the same engines 530, policies 535 and data 540 for all connected devices 310.

The remote management module 550 enables communication with security administrator 325 (and/or other security administrators), and enables local updating of security engines 530, security policies 535, security data 540 including signatures and other applications. In one embodiment, modification to the security policies 535 and data 540 can be done by the security administrator 325 only. The remote management module 550 of the mobile security system 345 may receive updates from an update authorities device (UAD), e.g., on the security administrator 325 via a secured connection. A UAD may operate on an update server at a customer IT center located on the internet 330 to forward updates to mobile security systems 345 that possibly do not belong to an enterprise 540 in charge of managing updates. A UAD may operate on a mobile security system 345. Security engine 530 updates may modify the anti-virus engine DLL, etc. OS and security application updates may be implemented only from within the enterprise 540 while connecting to the security administrator 325 and via an encrypted and authenticated connection.

The security administrator 325 can modify URL black and white lists for remote support to traveling users. In case of false positives, the security administrator 325 may allow access to certain URLs, by bypassing the proactive heuristics security but still monitoring by firewall, anti-virus, IPS/IDS, etc. Additional remote device-management features may enable the security administrator 325 to perform remote diagnostics, access local logs, change configuration parameters, etc. on the mobile security system 345. The security administrator 325 may delegate tasks to a helpdesk for support.

Figure 7:
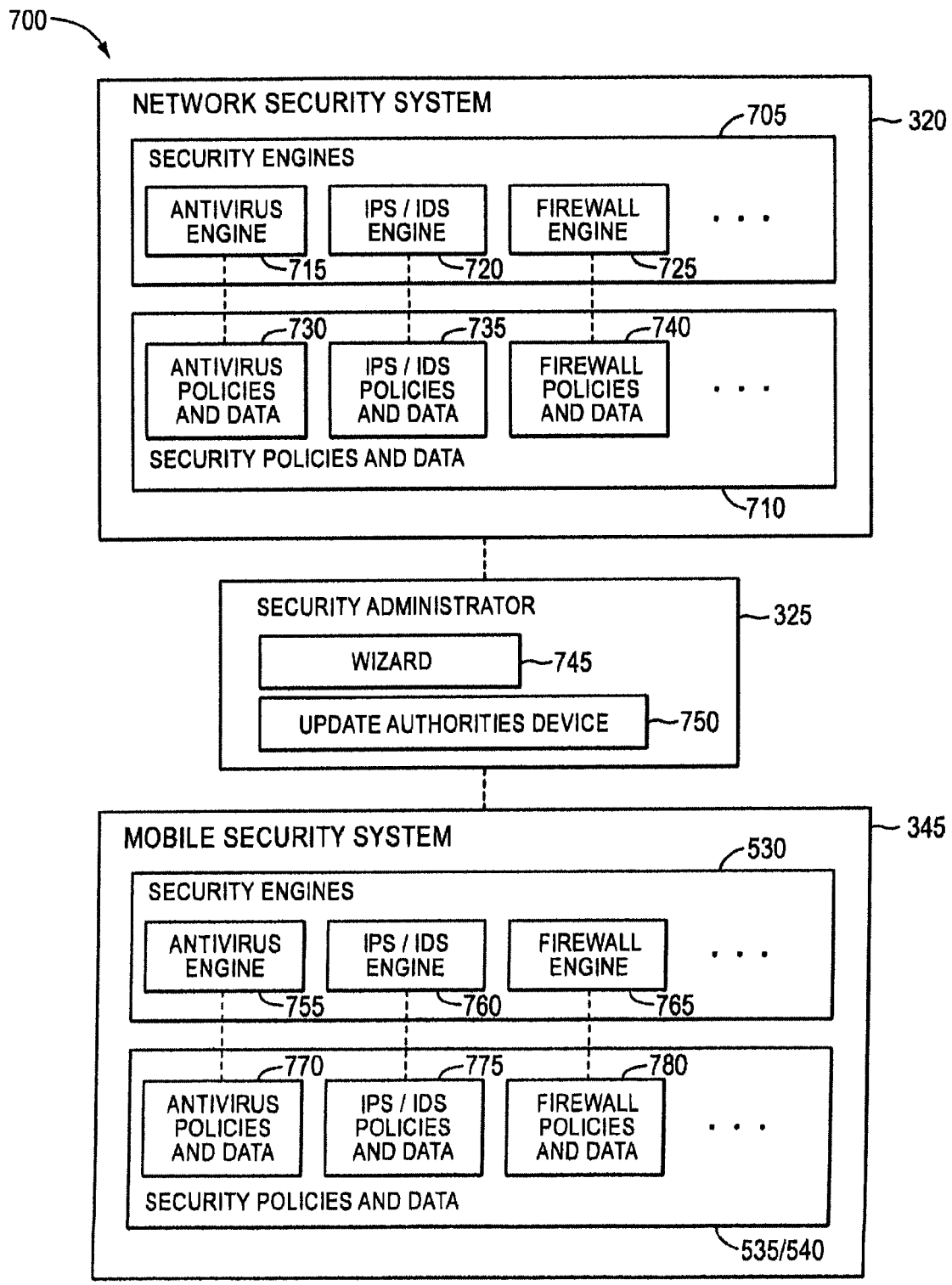
FIG. 7 is a block diagram illustrating details of a smart policy updating system in accordance with an embodiment of the present invention.

The remote management module 550 may communicate with a wizard (e.g., wizard 745), which may be on the security administrator 325, as illustrated in FIG. 7, or on another system. Details of the wizard 745 and details of the communication schemes between the remote management module 550 and the wizard 745 are described below with reference to FIG. 7.

The distribution module 555 enables distribution of updates, e.g., security policy 535 updates including rule updates, security data 540 updates including signature updates, security engine 530 updates, application/OS updates, etc. by the mobile security system 345 to N other mobile security systems 345. A routing table identifying the N other mobile security systems 345 to whom to forward the updates may be provided to the distribution module 555 to enable system 345 to system 345 communication. Updates may be implemented according to policies set by the security administrator 325. When forwarding updates, the distribution module 555 acts as a UAD.

Each mobile security system 345 may obtain its routing table with security information updates, periodically, at predetermined times, upon login, etc. The routing tables may be maintained on a server, e.g., the security administrator 325 or another mobile security system 345. In one embodiment, the mobile security systems 345 may contact the server to retrieve the routing tables. Alternatively, the server may push the routing tables to the mobile security systems 345.

Figure 9:
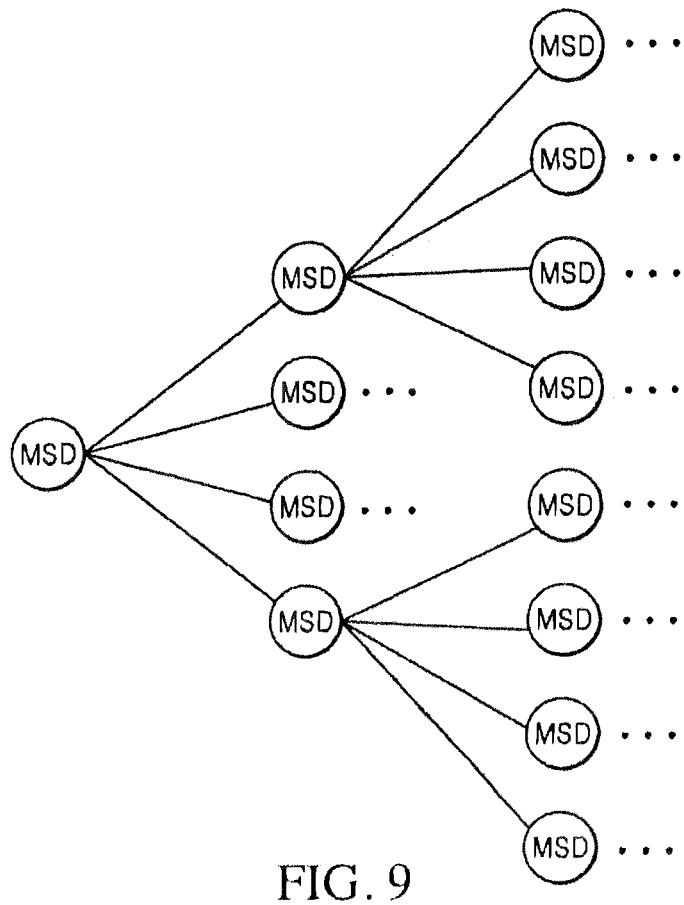
FIG. 9 is a block diagram illustrating details of the communication technique for spreading security code to the mobile security systems.

The distribution module 555 may enable rapid updates as shown in FIG. 9. Currently, all commercial anti-virus products available do not update devices faster than viruses spread. To assure that a new virus attack does not spread faster than for example signature updates, each mobile security system 345 may be an active UAD. In one embodiment, as shown in FIG. 9, each mobile security system 345 is responsible for forwarding the signature updates to four other devices 345. As one skilled in the art will recognize, all devices 345 need to forward to the same number of other devices 345. Multiple devices 345 may be responsible for forwarding to the same device 345. When necessary, offline devices 345 being activated may poll the server, e.g., the security administrator 325, for routing table updates. Many other updating techniques are also possible.

The backup module 560 may constantly backup image and changes of the boot sector and system files of the mobile device 310 into the flash memory 520 or into another persistent memory device. That way, in case of major failure, including a loss of the system or boot sector of the mobile device 310, the mobile security system 345 may be identified as a CD-ROM during reboot and may launch the backup module (or separate program) to restore the boot sector and system files on the mobile device 310, thereby recovering the mobile device 310 without the need for IT support. In an embodiment where the network security system 345 supports multiple mobile devices 310, the backup module 560 may contain separate boot sector and system files for each of the mobile devices 310, if different.

FIG. 7 is a block diagram illustrating details of a smart policy updating system 700 in accordance with an embodiment of the present invention. System 700 includes the security administrator 325 coupled to the network security system 320 and to the mobile security system 345. The network security system 320 includes security engines 705, including an anti-virus engine 715, an IPS/IDS engine 720, a firewall engine 725, and other security engines. The network security system 320 also includes security policies and data 710, including anti-virus policies and data 730, IPS/IDS policies and data 735, firewall policies and data 740, and other policies and data. Similarly, the mobile security system 345 includes an anti-virus engine 755, an IPS/IDS engine 760, a firewall engine 765, and other engines. The mobile security system 345 also includes security policies and data 535/540, including anti-virus security policies and data 770, IPS/IDS security policies and data 775, firewall security policies and data 780, and other security policies and data.

The security administrator 325 includes a wizard 745 for enabling substantially automatic initial and possibly dynamic setup of the security engines 530, security policies 535 and security data 540 on the mobile security system 345. In one embodiment, the wizard 745 may automatically load all security engines 705 and policies and data 710 of the network security system 320 as the security engines 530 and policies and data 535/540 on the mobile security system 345. In another embodiment, the wizard 745 may include all security engines 705 and policies and data 710 except those known to be irrelevant, e.g., those related to billing software used by accounting, those relating to web software running only on the web servers, etc. In another embodiment, the engines 530 would need to be loaded by an IT manager, and would not be loaded automatically by the wizard 745.

In one embodiment, the wizard 745 may determine whether the mobile security system 345 requires a particular security engine 530, e.g., an anti-virus engine 755, IPS/IDS engine 760, firewall engine 765, etc. If so determined, then the wizard 745 would load the engine 530 onto the mobile security system 345. The wizard 745 would then determine which policies and data sets, e.g., some for anti-virus engine 755, some for the IPS/IDS engine 760, some for the firewall engine 765, etc. are important to the mobile security system 345. The wizard 745 will then determine which of the anti-virus policies and data 730 on the network security system 320 are relevant to the anti-virus policies and data 770 on the mobile security system 345, which of the IPS/IDS policies and data 735 on the network security system 320 are relevant to the IPS/IDS policies and data 775 on the mobile security system 345, which of the firewall policies and data 740 on the network security system 320 are relevant to the firewall policies and data 780 on the mobile security system 345, and which of the other policies and data on the network security system 320 are relevant to the policies and data on the mobile security system 345. As stated above, the wizard 745 may determine that all security engines 705 or just a subset are needed on the mobile security system 345. The wizard 745 may determine that all policies and data 710 for a given engine type or just a subset should be forwarded. The wizard 745 may determine which relevant policies and data 710 should be forwarded to the mobile security system 345 based on rules developed by an IT manager, based on item-by-item selection during the setup procedure, etc. Alternative to the wizard 745, an IT manager can setup the engines 530 and policies and data 535/540 on the mobile security system 345 without the wizard 745.

The security administrator 325 may also include an update authorities device 750. The update authorities device 750 may obtain security system updates (e.g., signature updates) and may send the updates to the network security system 320 and to the mobile security system 345. One skilled in the art will recognize that the updates to the network security system 320 and the updates to the mobile security system 345 need not be the same. Further, the update authorities device 750 may obtain the updates from security managers, security engine developers, anti-virus specialists, etc. The update authorities device 750 may forward the updates to all network security systems 320 and all mobile security systems 345, or may forward routing tables to all mobile security systems 345 and the updates only to an initial set of mobile security systems 345. The initial set of mobile security systems 345 may forward the updates to the mobile security systems 345 identified in the routing tables in a P2P manner, similar to the process illustrated in FIG. 9. As stated above, each mobile security system 345 operating to forward updates is itself acting as an update authorities device 750.

Other applications may be included on the mobile security system 345. For example, add-on applications for recurring revenue from existing customers may include general email, anti-spam, direct and secured email delivery, information vaults, safe skype and other instant messaging services, etc.

Email Security and Anti-spam—implementation of mail relay on mobile security systems 345 (including the web security engine above) and a local spam quarantine (based on SendMail or similar process) may implement a complete mail security suite (SMTP and POP3) including anti-spam with real time indexing (via online web spam quarries). Users may have access to the quarantine to review spam messages, release messages, modify and custom spam rules, etc., via a web interface.

Direct and Secured Email Delivery based on mail relay will allow the mobile security system 345 to send user email directly from one mobile security system 345 to another mobile security system 345 without using in route mail servers. This allows corporate users to send emails that need not travel in the internet, thus leaving trace and duplicates on different unknown mail servers in route. This combined with the ability to use a secured pipe between two mobile security systems is valuable to corporations. Without such methodology, people could trace emails exchange without accessing to the enterprise's mail server, by tracking down copies in intermediate mail servers that were used to deliver the messages.

Information Vault—Application to encrypt and store end user information on the mobile security system 345 may be available only to authorized users via a web interface and a web server implemented on every mobile security system 345 (e.g., BOA, Apache, etc.)

Safe Skype and Other IM—implementing an instant messaging client on the mobile security system 345 can guarantee that the instant messaging system or P2P application has no access to data on the mobile device 310. Adding a chipset of AC/97 to provide a sound interface on the mobile security system 325 could allow users to talk and receive calls directly from/to the mobile security system 325.

Although not shown, a small battery may be included with the mobile security system 345. This battery may be charged by the USB connection during runtime or using the power adapter at any time. The battery may guarantee proper shutdown, e.g., when user disconnects the USB cable from the mobile security system 345. It will be signaled by the system which will launch applications and system shutdown. This will ensure a proper state of the file system and flashing open files buffers.

A multi-layered defense and detection abilities is required. This may be done by a special code that is constantly monitoring the scanning result by different systems (anti-virus, IDS/IPS, firewall, antispyware, URL category, etc.) and at different levels to build a puzzle and identify an attack even if it's not recognized by each of the individual subsystems. By doing this, the mobile security system 345 will maintain and in some cases even improve the security level provided within the enterprise 540.

One available benefit of the mobile security system 345 is its ability to enforce the policy of the enterprise 540 on the end user while they are traveling or working from home. Since the mobile security system 345 uses similar security engines and policy as when connected from within the enterprise 540 and since the end user cannot access the internet 330 without it (except via VPN connection into the enterprise 540), IT may be capable of enforcing its security policy beyond the boundaries of the enterprise 540. The OS may be under the entire supervision of IT, while the mobile security system 345 OS acts as an end user OS under his control. This resolves the problems of who controls what and how security and productivity face minimal compromise.

A standalone version of the mobile security system 345 may offer the same functionality, and may provide a local management interface via web browser. Attractive to home users and small offices that lack an IT department, the mobile security system 345 enables the end user to launch a browser, connect to the mobile security system 345, set the different policies (update policy, security rules, etc.) including modifying the white and black URL lists, etc. There is also an opportunity to provide end users with a service of remote management of the mobile security systems 345 by subscription.

Figure 10A:
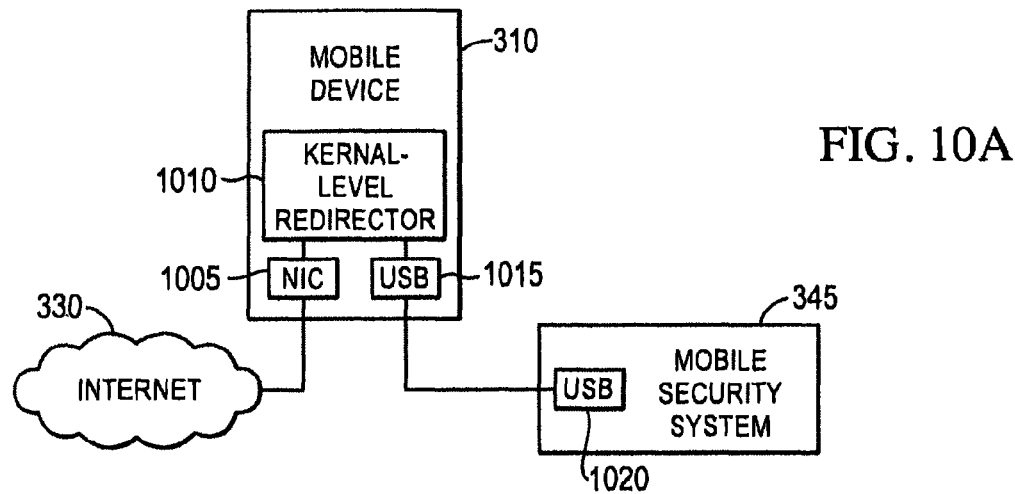
FIGS. 10A-10C are block diagrams illustrating various architectures for connecting a mobile device to a mobile security system, in accordance with various embodiments of the present invention.
Figure 10B:
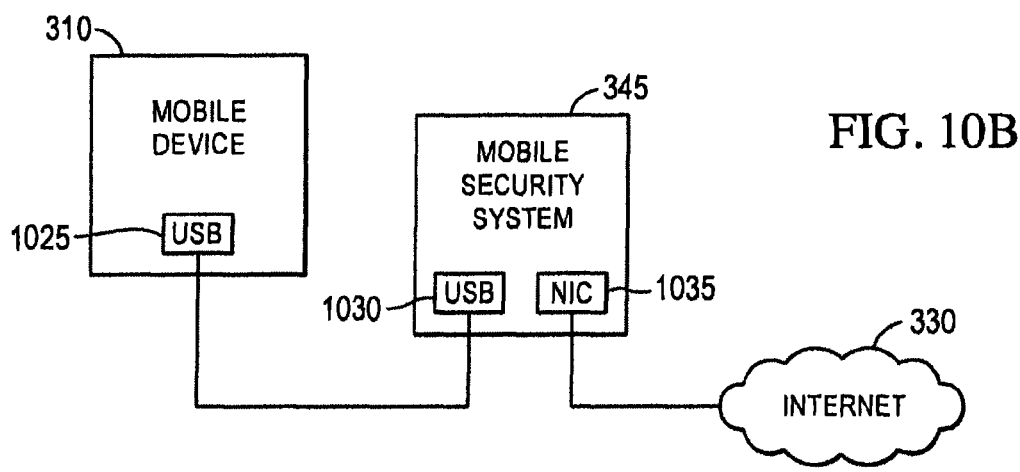
Figure 10C:
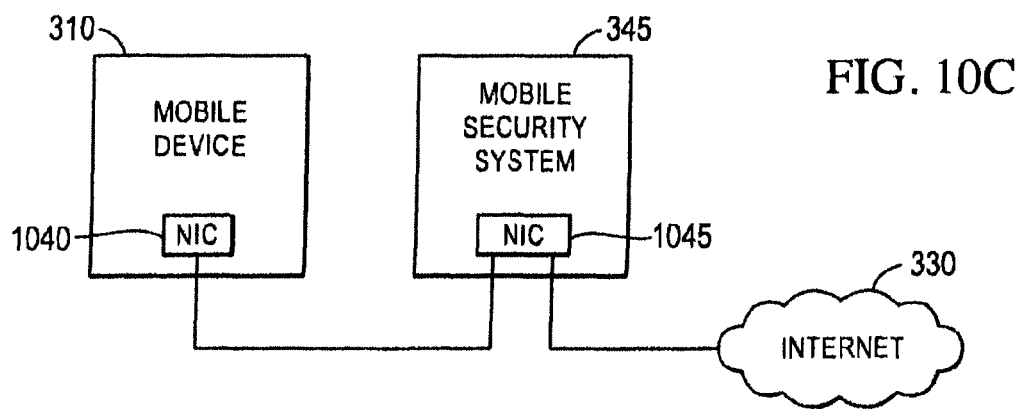

FIGS. 10A, 10B and 10C illustrate three example architectures of connecting a mobile security system 345 to a mobile device 310, in accordance with various embodiments of the present invention. In FIG. 10A, the mobile device 310 is coupled to the mobile security system 345 via USB connections 1015 and 1020 and is coupled to the internet 330 via a NIC card 1005. The mobile device 310 receives internet traffic from the internet 330 via its NIC card 1005. A kernel-level redirector 1010 (e.g., via NDIS, Winsock, etc.) on the mobile device 310 automatically redirects the internet traffic via the USB connections 1015 and 1020 to the mobile security system 345, which scans, cleans and returns the cleaned internet traffic to the mobile device 310 via the USB connections 1015 and 1020. In FIG. 10B, the mobile device 310 is coupled to the mobile security system 345 via USB connections 1025 and 1030. The mobile security system 345 includes a NIC card 1035 for receiving internet traffic from the internet 330. The mobile security system 345 scans, cleans and forwards the internet traffic via the USB connections 1025 and 1030 to the mobile device 310. In FIG. 10C, the mobile device 310 is coupled to the mobile security system 345 via NIC cards 1040 and 1045. The mobile security system 345 receives internet traffic from the internet 330 via its NIC card 1045. The mobile security system 345 scans, cleans and forwards the internet traffic wirelessly via the NIC cards 1040 and 1045 to the mobile device 310. Other connection architectures are also possible.

Figure 12:
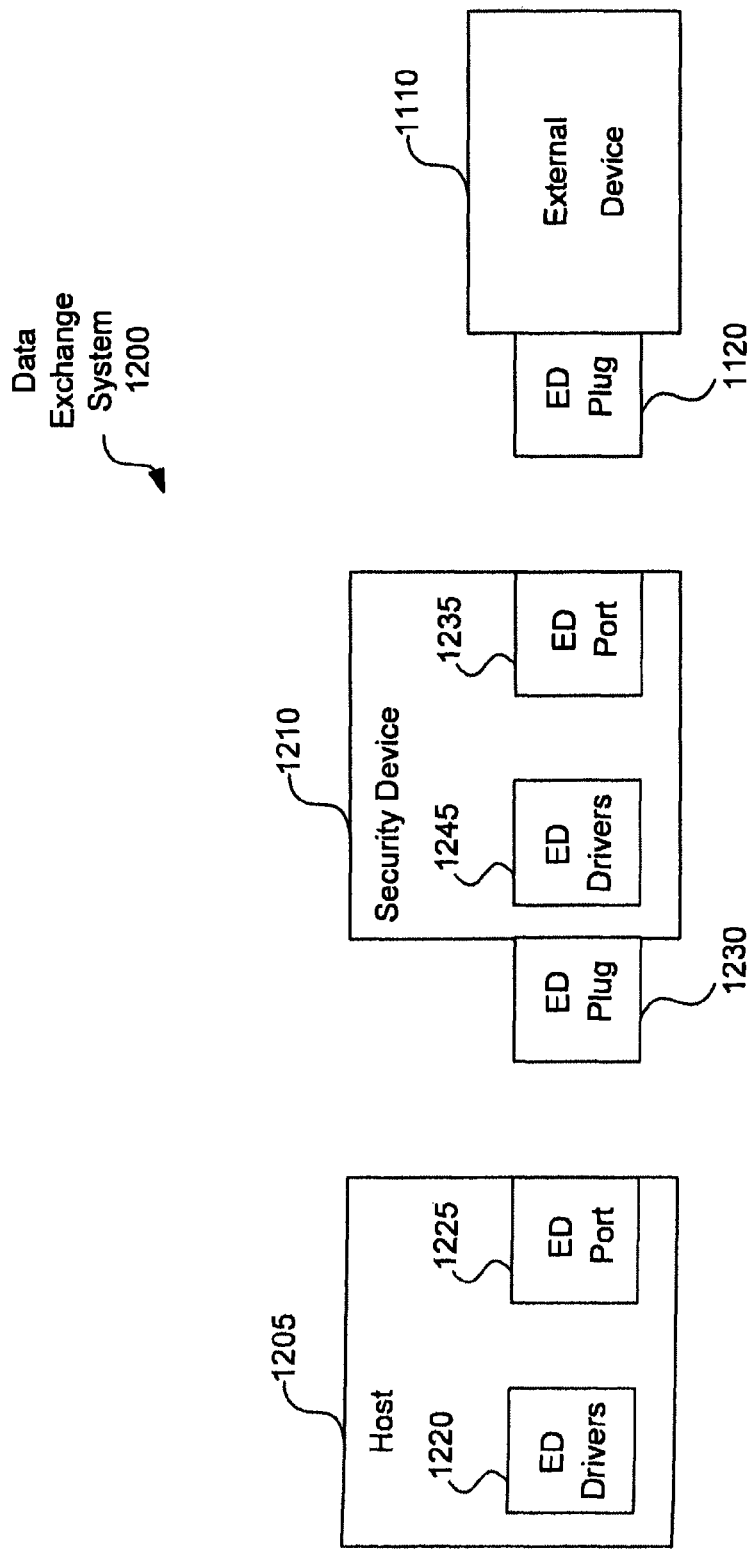
FIG. 12 is a block diagram illustrating a secure data exchange system, in accordance with an embodiment of the present invention.

FIG. 12 is a block diagram illustrating a secure data exchange system 1200, in accordance with an embodiment of the present invention. The secure data exchange system 1200 includes a host computer (host) 1205 coupled via a security device 1210 to an external device 1110. The host 1205 may include a laptop, desktop, PDA, mobile phone, or other processor-based device. The external device 1110 may be any external device with memory such as a USB drive, external hard drive, PDA, music player, cell phone, etc. The security device 1210 is communicatively coupled to the host 1205 via an ED port 1225 (USB, serial, parallel, Firewire, Ethernet, WiFi, WiMAX, GSM, CDMA, BlueTooth, PCMCIA and/or other connection) and an ED plug 1230 (USB, serial, parallel, Firewire, Ethernet, WiFi, WiMAX, GSM, CDMA, BlueTooth, PCMCIA and/or other connection). The external device 1110 is communicatively coupled to the security device 1210 via an ED port 1235 (USB, serial, parallel, Firewire, Ethernet, WiFi, WiMAX, GSM, CDMA, BlueTooth, PCMCIA and/or other connection) and ED plug 1120 (USB, serial, parallel, Firewire, Ethernet, WiFi, WiMAX, GSM, CDMA, BlueTooth, PCMCIA and/or other connection). The connector type of the ED port 1225 and ED plug 1230 combination may be different that the connector type of the ED port 1235 and ED plug 1120 combination. In one embodiment, all ports 1225/1235 and plugs 1230/1120 are USB. Although the plugs 1120/1230 are illustrated as male and ports 1225/1235 are shown as female, one skilled in the art will recognize that the opposite is possible (plugs 1120/1230 may be female and ports 1225/1235 may be male).

The host 1205 includes ED drivers 1220 for performing enumeration and enabling communication with the security device 1210. Similarly, the security device 1210 includes ED drivers 1245 for performing enumeration and enabling communication with the external device 1110.

In one embodiment, the security device 1210 includes a programmable hardware appliance capable of enforcing security policies to protect against malicious code such as viruses, spyware, adware, Trojan Horses, etc. and to protect against transfer of private data. In one embodiment, the security device 1210 is configured to protect both the host 1205 and the external device 1215. In one embodiment, the security device 1210 is configured to protect only one of the external device 1110 or the host 1205. Additional details of the security device 1210 are provided with reference to FIGS. 13 and 14.

Figure 13:
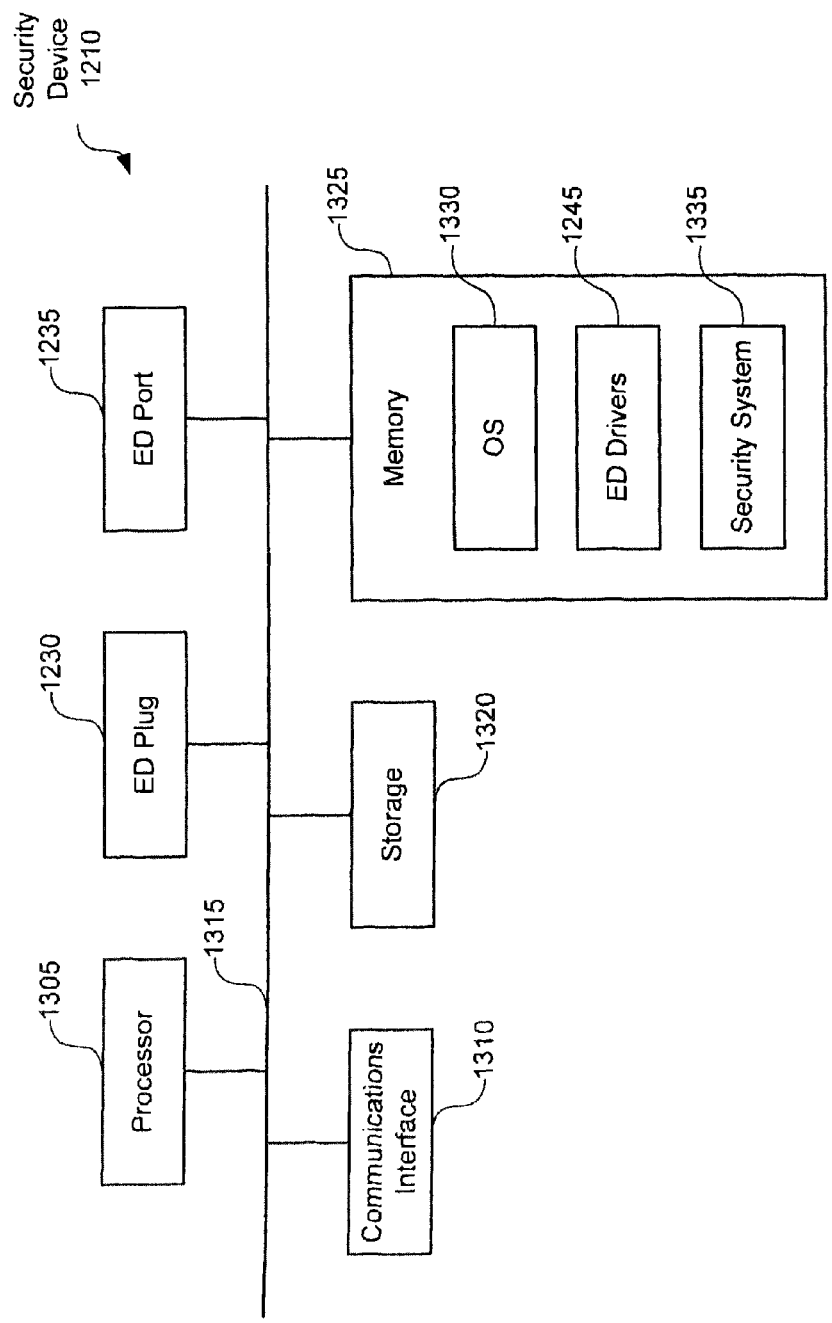
FIG. 13 is a block diagram illustrating details of a security device, in accordance with an embodiment of the present invention.

FIG. 13 is a block diagram illustrating details of the security device 1210, in accordance with an embodiment of the present invention. The security device 1210 include a processor 1305, such as an Intel Pentium® microprocessor or a Motorola Power PC® microprocessor, coupled to a communications channel 1315. The security device 1210 further includes an ED plug 1230, an ED port 1235, a communications interface 1310, storage 1320 such as an EEPROM, and memory 1325 such as Random-Access Memory (RAM) or Read Only Memory (ROM), each coupled to the communications channel 1315. The communications interface 1310 may be coupled to a network such as the internet. One skilled in the art will recognize that, although the storage 1320 and memory 1325 are illustrated as different units, the data storage device 1320 and memory 1325 can be parts of the same unit, distributed units, virtual memory, etc. The term "memory" herein is intended to cover all data storage media whether permanent or temporary. One skilled in the art will recognize that the security device 1210 may include additional components, such as network connections, additional memory, additional processors, LANs, input/output lines for transferring information across a hardware channel, the internet or an intranet, etc.

As shown, memory 1325 stores an operating system 1330 such as the Microsoft Windows XP, the IBM OS/2 operating system, the MAC OS, Unix OS, Linux OS, etc. It will be appreciated that a preferred embodiment may also be implemented on platforms and operating systems other than those mentioned. An embodiment may be written using JAVA, C, and/or C++ language, or other programming languages, possibly using object oriented programming methodology. The memory 1325 also stores ED drivers 1245 and a security system 1335. The ED drivers 1245 may include standard drivers for standard external devices 1110 and proprietary drivers for proprietary external devices 1110. The ED drivers 1245 may be transferred onto the memory 1325 via ED plug 1230. The security system 1335 includes code for enforcing security policies on data transfer actions between the host 1205 and external device 1110.

Figure 14:
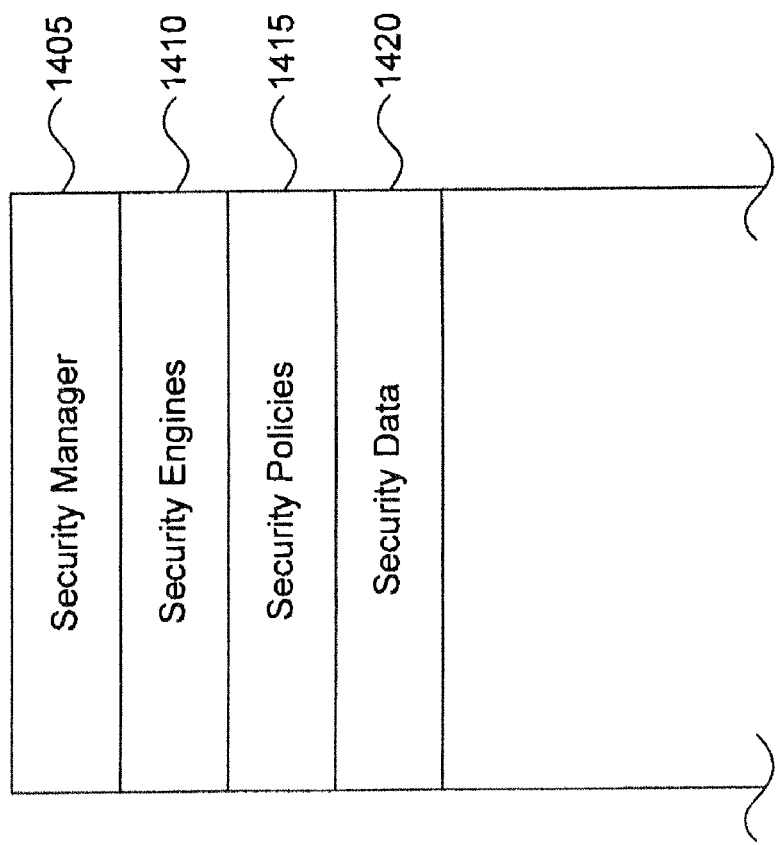
FIG. 14 is a block diagram illustrating details of a security system, in accordance with an embodiment of the present invention.

FIG. 14 is a block diagram illustrating details of a security system 1335, in accordance with an embodiment of the present invention. The security system 1335 includes a security manager 1405, security engines 1410, security policies 1415, and security data 1420.

In one embodiment, the security manager 1405 includes code for performing enumeration, namely, to identify the external device 1110 or external device 1110 type and to identify the corresponding ED driver 1245 capable of establishing communication between the security device 1210 and the external device 1110. The security manager 1405 also includes code to control execution of the various security engines 1410 based on the security policies 1415 and security data 1420 to evaluate data transfer requests or other device requests. Further, the security manager 1405 includes code to communicate with the host 1205, which will be the source of the data transfer and/or other requests.

In one embodiment, the security engines 1410 includes code for securing the transfer of data between the host 1205 and the external device 1110 based on the security policies 1415 and security data 1420. The security engines 1410 may include firewalls, anti-virus, antispyware, malicious content filtering, multilayered security monitors, Java and bytecode monitors, etc. The security engines 1410 may also include data privacy modules to enforce data privacy policies 1415. Each security engine 1410 may have dedicated security policies 1415 and security data 1420 to indicate which procedures, URLs, system calls, content, ID, etc. the data requested for transfer may contain or whether the data requested for transfer is considered nontransferable (or nontransferable without additional security measure such as a password and ID).

To provide a higher security level, the security engines 1410 may implement content analysis and risk assessment algorithms. In one embodiment, a security engine 1410 assigns a weight and rank for every transfer object based on its type, complexity, richness in abilities, source, etc. The security engine 1410 may assign weight based on the source using a list of known dangerous or known safe sources. The security engine 1410 may assign weight to objects based on the category of the source, e.g., a gambling source, an adult content source, a news source, a reputable company source, a banking source, etc. The security engine 1410 may calculate the weight, and based on the result determine whether to allow or disallow access to the content, the script to run, the system modification to occur, etc. The security engine 1410 may "learn" user content (by analyzing for a predetermined period of time the general content that the user accesses) and accordingly may create personal content profiles. The personal content profile may be used to calibrate the weight assigned to content during runtime analysis to improve accuracy and tailor weighted risk analysis for specific user characteristics.

Thus, upon receiving a data transfer and/or other request from the host 1205, the security manager 1405 will launch the appropriate security engines 1410 based on the security policies 1415. For example, the security policies 1415 may be configured not to allow specific ActiveX controls to be loaded from the host 1205 onto the external device 1110. The security policies 1415 may be configured not to allow data transfer from private folders on the host 1205 to the external device 1110. The security manager 1405 will launch the appropriate security engines 1410 to assure that these example security policies 1415 are met. Further, the security engines 1410 may use security data 1420, which may include definition files of malicious ActiveX controls, locations of private folders, etc.

Although not shown, the security system 1335 may include additional components such as the preboot flash 520 with OS and applications, the remote management module 550, the distribution module 555, and the backup module 560 discussed above with reference to FIG. 5. Other components are also possible.

Figure 15:
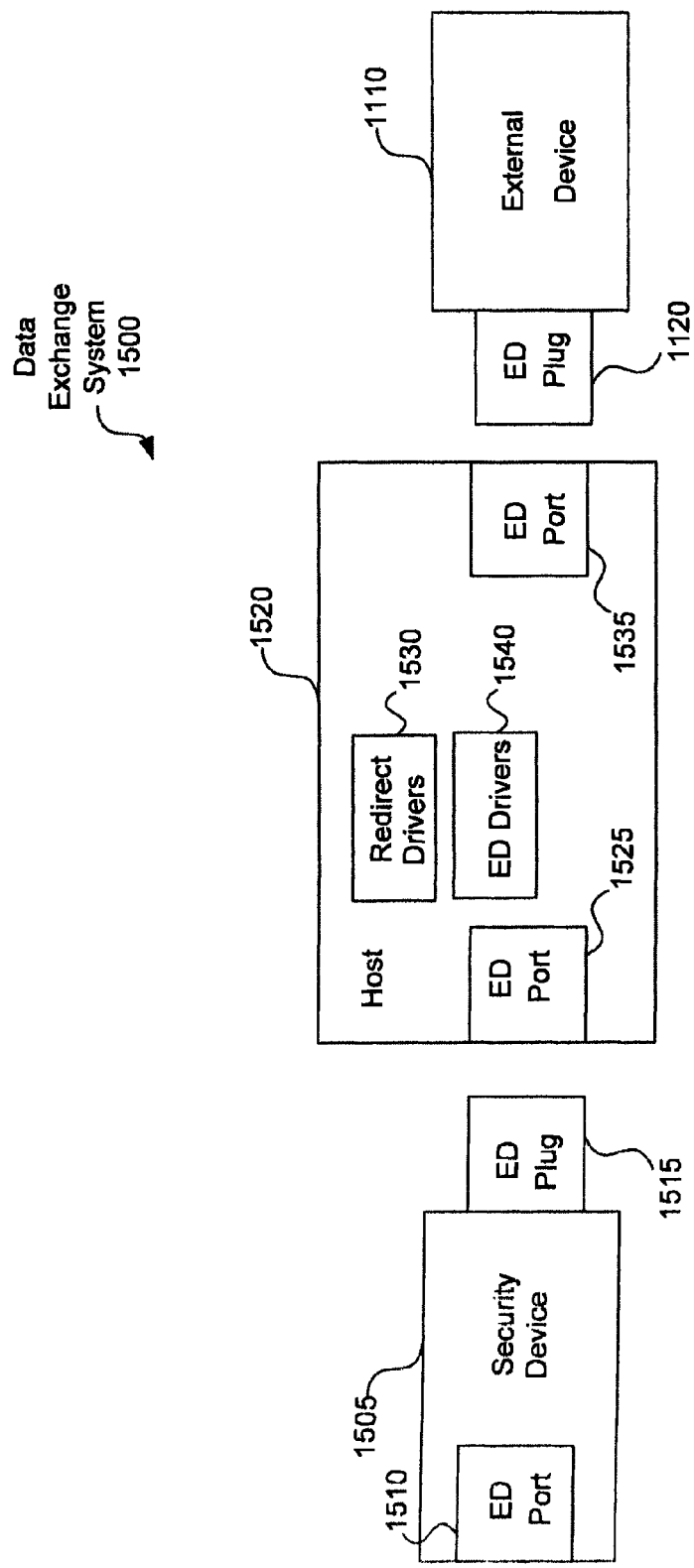
FIG. 15 is a block diagram illustrating a secure data exchange system, in accordance with another embodiment of the present invention.

FIG. 15 is a block diagram illustrating a secure data exchange system 1500, in accordance with another embodiment of the present invention. The secure data exchange system 1500 includes a security device 1505 communicatively coupled to the host 1520 via an ED plug 1515 on the security device 1505 and a first ED port 1525 on the host 1520. The secure data exchange system 1500 also includes an external device 1110 communicatively coupled to the host 1520 via the ED plug 1120 on the external device 1110 and a second ED port 1535 on the host 1520.

Because the external device 1110 is not directly coupled to the security device 1505, the security device 1505 is not physically intercepting the data transfer requests between the external device 1110 and the host 1520. Accordingly, in this embodiment, the host 1520 includes a redirect driver 1530, which is configured to redirect data transfer requests between the external device 1110 and the host 1520 regardless of data transfer direction. In one embodiment, the security device 1505 may be configured to protect only one of the external device 1110 or the host 1520. Further, in one embodiment, the security device 1505 does not contain any ED drivers, e.g., ED drivers 1245.

In one embodiment, if the security device 1505 is not coupled to the host 1520, the host 1520 uses the ED drivers 1540 to communicate with the external device 1110. In one embodiment, the host 1520 is configured not to communicate with the external device 1110 until the security device 1505 is coupled to the host 1520. In one embodiment, the host 1520 uses the ED drivers 1540 to communicate with the external device 1110 only if additional security measures are taken, such as receipt of a password and ID, or until the security device 1505 is coupled to the host 1520.

In one embodiment, the host 1520 may conduct enumeration of the security device 1505 upon connection of the security device 1505 to the ED port 1525. Upon identifying the security device 1505 or security device 1505 type, the host 1520 may initiate the redirect driver 1530 to redirect all data transfer requests or other external device 1110 requests from all other ED ports 1535 to the security device 1505. In one embodiment, the redirect driver 1530 only accepts data transfer requests from the security device 1505, which presents the requests of the external device 1110 as a proxy. In one embodiment, the redirect driver 1530 performs data transfer requests received from the external device 1110 only after the security device 1505 has conducted its check and given its authorization. Other protocols are also possible.

Figure 16:
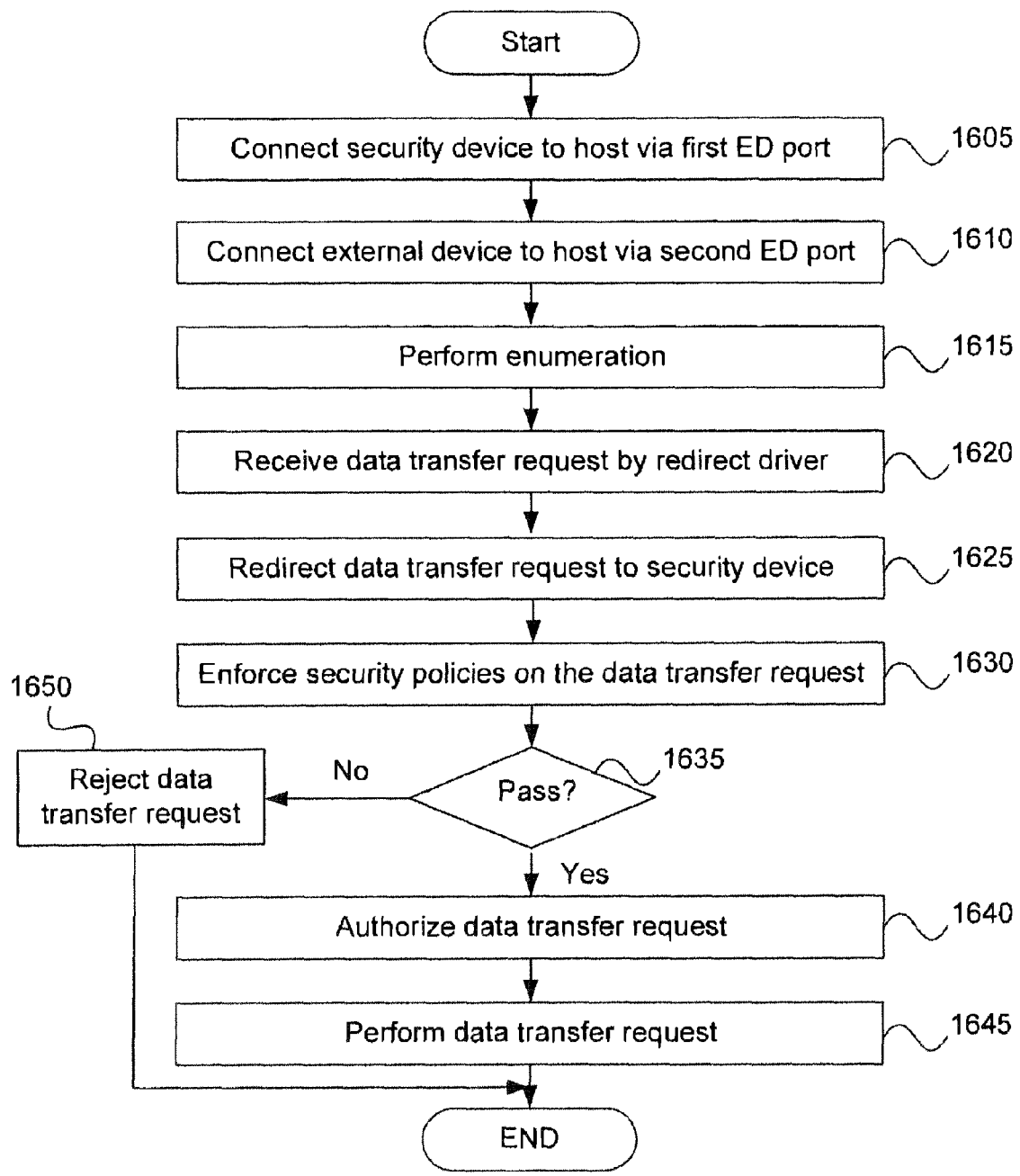
FIG. 16 is a flowchart illustrating a method of secure data exchange between a host and an external device, in accordance with an embodiment of the present invention.

FIG. 16 is a flowchart illustrating a method 1600 of secure data exchange between a host and an external device, in accordance with an embodiment of the present invention. The method 1600 begins in step 1605 with the security device 1505 being connected to the first ED port 1525 of the host 1520. The external device 1110 in step 1610 is connected to the second ED port 1535 of the host 1520. The host 1505 in step 1615 performs enumeration techniques to identify the security device 1505 and the external device 1110 and to install the appropriate drivers 1530/1540 to enable communication with the security device 1505 and the external device 1110. The redirect driver 1530 in step 1620 receives a data transfer request from either the host 1505 to the external device 1110 or from the external device 1110 to the host 1505. The redirect driver 1530 in step 1625 redirects the data transfer request to the security device 1505, which in step 1630 enforces its security policies (anti-virus, antispyware, anti-adware, data privacy, etc.) on the data transfer request. The security device 1505 in step 1635 determines whether the data transfer request passes the security policies. If so, then the security device 1505 in step 1640 authorizes the data transfer request and the host 1520 in step 1645 performs the data transfer request. If not, then the security device 1505 in step 1650 rejects the data transfer request. Method 1600 then ends.

It will be appreciated that, in one embodiment, the security device 1210/1505 may be implemented as part of the host 1205/1520, e.g., within the housing of the host 1205/1520 and/or as a security procedure executed by the host 1205/1520.

In various embodiments, a mobile security system (discussed herein) may be coupled to a mobile device, digital device or other computer system (e.g., computer system 400). A digital device is any device with a processor. After a predetermined duration, the mobile device may enter a power management mode. During power management mode, the mini-computer may wake the mobile device or take control of one or more components of the mobile device to manage security services (e.g., perform security functions). Security services may include, but are not limited to, scanning the mobile device, updating the mobile device, and/or performing maintenance functions. Once the security services are completed, the mobile device and/or components of the mobile device may return to power management mode.

Scanning the mobile device may comprise scanning the hard drive, memory (e.g., RAM), and/or peripherals of the mobile device for malware (e.g., viruses, worms, Trojan horses, root kits, key loggers, spyware, and tracking cookies). Scanning the mobile device may also comprise scanning for unauthorized data such as unauthorized programs, unauthorized data, or inappropriate content (e.g., adult media).

Security services may also comprise taking corrective action if malware or unauthorized data is found. In one example, corrective action comprises reporting if malware or unauthorized data is found. In another example, corrective action may comprise deleting or quarantining the malware and/or unauthorized data.

Updating the mobile device may comprise updating security applications (e.g., anti-virus application, firewall application, and anti-spyware application), updating an operating system (e.g., with patches), updating drivers, and/or updating other files and applications. Performing maintenance may comprise, for example, defragmenting memory (e.g., a hard drive), emptying trash, emptying a recycle bin, deleting temporary files, and/or removing cookies.

In some embodiments, the mobile security system detects a wake event and then may either take control of one or more components of the mobile device or terminate the power management mode of the mobile device in order to perform the security services. A wake event may comprise the occurrence of a certain time of day (e.g., 3:00 AM) or the expiration of a predetermined period of time (e.g., two hours after the mobile device enters into power management mode).

The wake event may also comprise the mobile security system receiving data. In one example, the mobile security system may receive a flag, update, and/or alarm from another digital device over a network (e.g., security administrator—see security administrator 325 of FIG. 3). The mobile security system may then wake the mobile device and/or one or more components of the mobile device based on the flag, update, and/or alarm. The mobile security system may then perform the security services.

Figure 17:
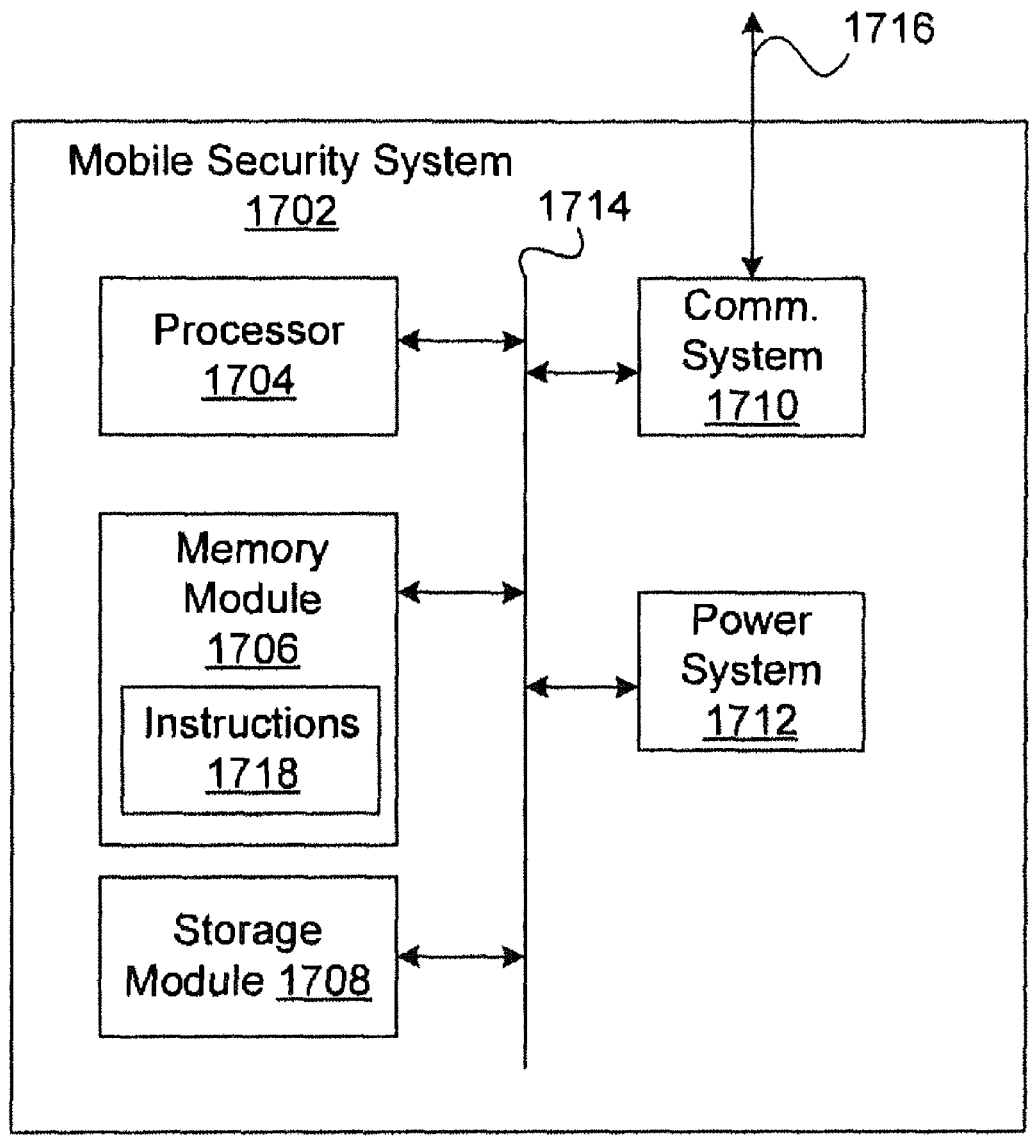
FIG. 17 is a block diagram illustrating details of a mobile security system in an embodiment of the present invention

FIG. 17 is block diagram illustrating details of a mobile security system 1702 in some embodiments of the present invention. The mobile security system 1702 comprises a processor 1704, a memory module 1706, a storage module 1708, a communication system 1710, and a power system 1712 coupled to a bus 1714. The processor 1704 is configured to execute instructions (e.g., programs). The mobile security system 1702 may be the mobile security system 345 discussed with respect to FIG. 3 herein. A module may comprise hardware (e.g., circuitry and/or firmware), software, or a combination of both.

The mobile security system 1702 may reside in a digital device. In various embodiments, the memory module 1706, storage module 1708, and the communication system 1710 may reside in flash memory devices, communication chips, or processors (e.g., network processors, general purpose processors, communication processors, or DSPs). The mobile security system 1702 may comprise instructions 1718 (e.g., instructions to manage security services) associated with a variety of programs (e.g., applications) including a firewall, network address translator (NAT), VPN client, intrusion detection and prevention system, HTTP proxy, FTP proxy, POP3 proxy, SMTP proxy, anti-virus program, anti-spyware program, anti-phishing program, anti-spam program, URL CAT, L-8 security engine, MLA security agent, DRM application, anti-leakage program, malicious content filter, multi-layered security monitor, Java monitor, bytecode monitor and/or data access client.

In various embodiments, the processor 1704 is configured by the instructions 1718 to manage security services such as analyze data for the presence of malicious code (e.g., malware). The processor 1704 may comprise circuitry capable of processing the instructions 1718. In some embodiments, the processor 1704 is virtualized. In other embodiments, the processor 1704 comprises a CPU, DSP, FPGA, or any processing unit.

The memory module 1706 includes memory (e.g., RAM, ROM, preboot flash 520, or a ram cache). The instructions 1718 may be loaded into the memory module 1706.

The storage module 1708 is any storage configured to retrieve and store data. Some examples of the storage module 1708 are flash media, hard drives, optical drives, and/or magnetic tape. In some embodiments, the mobile security system 1702 includes a memory module 1706 in the form of RAM and a storage module 1708 in the form of flash memory. Both the memory module 1706 and the storage module 1708 comprise computer readable media which may store instructions (e.g., instructions 1718) that are executable by a computer processor including the processor 1704.

The communication system 1710 is any device that receives data over link 1716. In some embodiments, the communication system 1710 is coupled to a network (e.g., internet 130) via the link 1716. Further, the communication system 1710 may also support wired and/or wireless communication (e.g., 802.11a/b/g/n, WiMax).

The optional power system 1712 comprises any power supply that provides power to the mobile security system 1702. In some embodiments, the mobile security system 1702 is part of a thumb drive, mini-computer, or other digital device. The power system 1712 may power the thumb drive, mini-computer, or other digital device. In some embodiments, the power system 1712 is a capacitor, battery, or other power source.

In various embodiments, the power system 1712 receives power from a digital device (e.g., computer system 400 or mobile device described further herein) that is coupled to the mobile security system 1702. In one example, the mobile security system 1702 is part of a digital device with an interface (e.g., USB) that is configured to be coupled with another digital device. Power may be received by the power system 1712 via the interface from the other digital device. In some embodiments, the power system 1712 may not have the capacity to store power. Alternately, the power system 1712 may have the capacity to store power received via the interface. In various embodiments, the power system 1712 may receive power from the interface and provide the power to the mobile security system 1702, provide the power to other components, and/or store the power.

The mobile security system 1702 as well as one or more of the components of the mobile security system 1702 (e.g., processor 1704, the memory module 1706, the storage module 1708, and the security router 1710) may be virtualized.

Further, those skilled in the art will appreciate that the mobile security system 1702 may be a part of a larger digital device. In one example, the processor 1704 used by the mobile security system 1702 may be the same processor used by the digital device.

Further, the memory module 1706 may comprise all or a portion of RAM memory within a digital device with one or more other components. In one example, a digital device may comprise 2 gigabytes of RAM memory. Some or all of that memory may be shared by the CPU of the digital device and the memory module 1706. In one example, the CPU scans data, cleans data, analyzes data, or otherwise protects the digital device from malware.

Similarly, the storage module 1708 may comprise all or a portion of the storage of the digital device. In one example, the digital device may comprise a one terabyte hard drive. Some or all of the one terabyte hard drive may be shared with the storage module 1708. In one example, the storage of the digital device stores instructions 1716.

Those skilled in the art will appreciate that the mobile security system 1702 may comprise more processors, modules, security routers, and/or other components than those depicted in FIG. 17. Further, the mobile security system 1702 may comprise fewer modules than those depicted in FIG. 17. For example, multiple functions may be performed by a single module.

Figure 18:
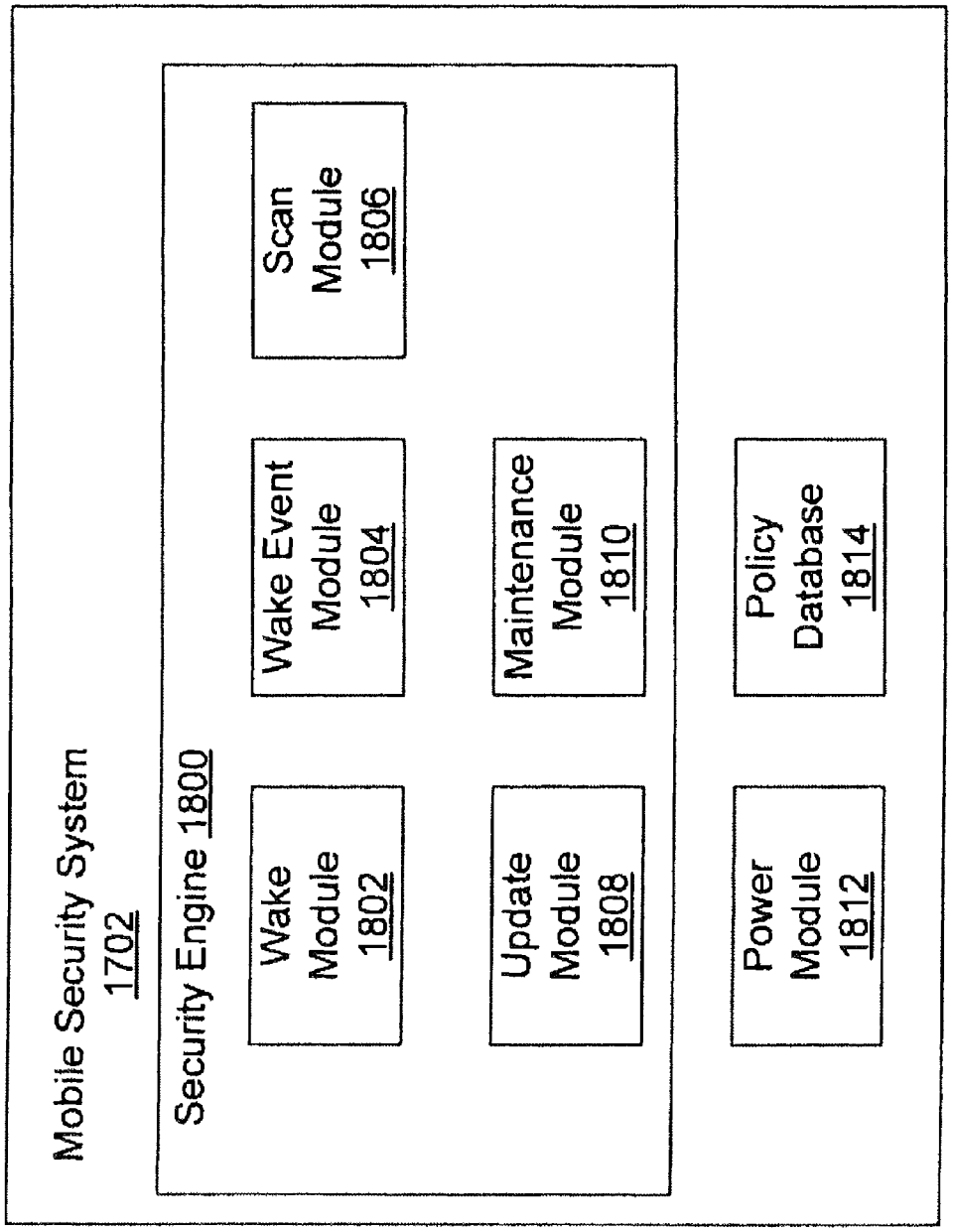
FIG. 18 is a block diagram of a mobile security system in another embodiment of the present invention.

FIG. 18 is a block diagram of a mobile security system 1702 in another embodiment of the present invention. The mobile security system 1702 comprises a security engine 1800, a power module 1812, and a policy database 1814. The security engine 1800 comprises a wake module 1802, a wake event module 1804, a scan module 1806, an update module 1808, and a maintenance module 1810.

The wake module 1802 is configured to wake a mobile device from a power management mode. A power management mode is a mode wherein the mobile device conserves power, usually after a predetermined period of inactivity (e.g., no input from a mouse and keyboard). During power management mode, the mobile device may reduce or eliminate power to one or more mobile device components such as a display and/or hard drive. In one example, the mobile device may save data in RAM to the hard drive and then reduce or eliminate power to the RAM and/or hard drive while in power management mode. Those skilled in the art will appreciate that power management mode may be a sleep mode, hibernation mode, or any other kind of mode wherein power is conserved. Traditionally, the mobile device may wake from a power management mode in response to an input from the user (e.g., via keyboard or mouse) or processor activity (e.g., data is received from a network).

The wake module 1802 may be configured to wake the mobile device from power management mode. In some embodiments, the mobile device (described further herein) is configured with a security agent that is configured to wake the mobile device or wake components of the mobile device when a wake signal from the wake module 1802 is received. In one example, the wake module 1802 sends a wake command to the security agent that is resident on the mobile device. The security agent receives the wake command and may wake the mobile device from the power management mode. When the mobile device is woken from the power management mode, the mobile device may enter into an active state such that security functions may be executed (e.g., the hard drive may be scanned, updates installed, and maintenance performed).

In some embodiments, the security agent may wake only one or more components of the mobile device without fully terminating the power management mode. In one example, in response to the wake command, the security agent may activate the hard drive in order to execute security functions but not pull the mobile device from power management mode (e.g., the display may remained unpowered). In various embodiments, while the mobile device is in power management mode, the security agent may selectively activate various components of the mobile device and perform security functions.

The wake module 1802 may also be configured to provide a power management signal to the mobile device to put the mobile device back to power management mode. Those skilled in the art will appreciate that the mobile device (or various components of the mobile device) may be configured to enter power management mode automatically without receiving a power management signal from the wake module 1802. In one example, the mobile device may be configured to enter into power management mode after a predetermined period of inactivity. In other embodiments, the wake module 1802 may be configured to provide the power management signal to the mobile device to put various components of the mobile device back to power management mode.

In various embodiments, encryption may be used to confirm the authenticity of the wake signal. In one example, an encrypted wake signal is provided from the wake module 1802 to the security agent of the mobile device. The security agent may decrypt the wake signal before waking the mobile device or waking components of the mobile device. Those skilled in the art will appreciate that signals associated with the security functions commanded by the mobile security system 1702 may also be encrypted in order to provide additional security to the mobile device. In some embodiments, the mobile security system 1702 may be required to provide a user name and/or password that must be accepted before the wake signal is accepted by the security agent or before the security agent will allow security functions to be performed.

The wake event module 1804 is configured to detect a wake event to trigger providing a wake signal from the wake module 1802. The wake module 1802 may be configured to trigger the wake signal being provided from the wake module 1802 in response to any number of wake events. A wake event may comprise a predetermined time or a predetermined duration. In one example, the wake event module 1804 triggers a wake signal at a predetermined time such as 3:00 AM daily. The wake event module 1804 may also be configured to trigger a wake signal at a predetermined date as well as time (e.g., 2:00 AM, the first and third Monday of the month). Those skilled in the art will appreciate that the wake signal may be triggered at any time and/or date. In some embodiments, a user or administrator may configure to the wake event module 1804 to trigger a wake signal at a date and/or time. The user may also configure the wake event module 1804 to trigger a wake signal at a recurring time and/or date (e.g., every day, twice a week, or twice a month).

The wake signal may also be triggered at a predetermined duration. In one example, the wake event module 1804 either monitors or is notified when the mobile device enters into the power management mode. After a predetermined period of time while the power management mode is still active, the wake event module 1804 may trigger a wake signal. The predetermined period may be a number of seconds, minutes, hours, and/or days. In some embodiments, the security agent on the mobile device indicates to the wake event module 1804 when the mobile device enters into power management mode. In various embodiments, the wake event module 1804 may determine that the mobile device is in power management mode. In one example, the wake event module 1804 determines that the mobile device in power management mode based on network activity (e.g., data received from a network, data provided to the network, or lack of data to or from the network).

The wake event may also comprise the wake event module 1804 receiving data such as a flag (e.g., an alarm) or file. In one example, the wake event module 1804 may detect a wake event when a flag or alarm is received. The flag or alarm may be sent from an security administrator (e.g., a security administrator 325 or the network security system 320 of FIG. 3). In another example, the wake event module 1804 may detect a wake event when an update is received. The update may be for a security application (e.g., virus definitions for an anti-virus program, whitelist of safe network sites, a blacklist of unsafe network sites, or junk email lists), operating system (e.g., operating system updates), and/or any application. The updates may be received from a digital device on the network including, but not limited to the security administrator 325 of FIG. 3, the network security system 320 of FIG. 3, or any digital device on the network.

In some embodiments, the wake event module 1804 may also be configured to trigger a power conservation mode signal to be provided to the mobile device. The mobile device may be configured (e.g., via the security agent) to enter into the power conservation mode or to place one or more components in the power conservation mode in response to the power conservation mode signal. The wake event module 1804 may be configured to trigger the power conservation mode signal based on any number of power conservation events, including, but not limited to the completion of one or more security services. In some embodiments, the scan module 1806, the update module 1808, and/or the maintenance module 1810 may, either in combination or separately, trigger the power conservation signal to be provided to the mobile device.

The scan module 1806 may be configured to scan the mobile device. In some embodiments, the scan module 1806 scans all or some memory of the mobile device (e.g., RAM and/or hard drive) as well as peripherals of the mobile device (e.g., external hard drives coupled to the mobile device). In one example, the scan module 1806 scans the registry, boot record, cookies, and applications of the mobile device for malware. In another example, the scan module 1806 performs a full scan of one or more hard drives, logical volumes, and/or petitions. In some embodiments, the scan module 1806 provides a scan signal to one or more security applications on the mobile device to perform the scans.

In various embodiments, the scan module 1806 scans the mobile device for malware such as, but not limited to, viruses, worms, Trojan horses, spyware, and tracking cookies. In one example, the scan module 1806 triggers an anti-virus application in the mobile security system to perform the scan on the mobile device.

If malware is found, the scan module 1806 may take corrective action such as delete or quarantine the malware and log the incident. In some embodiments, the scan module 1806 may issue a report on the scan, when the scan occurred, the type of scan, the results of the scan, and/or any corrective action. The report may be provided to an administrator, another digital device, and/or the mobile device. The scan module 1806 may also maintain a report and provide the report to an administrator, security administrator, or user (e.g., during an audit).

The scan module 1806 may also scan the mobile device for unauthorized data such as applications or files (e.g., media files, word processing files, databases, or records). In some embodiments, the scan module 1806 scans for applications that the user has installed without authorization on the mobile device. For example, the scan module 1806 may scan for toolbars, games, file transfer applications, new browsers, and the like.

The scan module 1806 may also scan for unauthorized data, such as files that the user and/or mobile device are not authorized to have access (e.g., salary data or operating information regarding products in a division that is unrelated to the mobile device or the user of the mobile device). In one example, the scan module 1806 scans metadata of the files to determine if the user and/or the mobile device have rights to the data. In some embodiments, the scan module 1806 may scan file names and documents for unauthorized information. The scan module 1806 may also be authorized to identify any files of a certain type as unauthorized. For example, the scan module 1806 may be configured to remove all music files and/or images.

In some embodiments, the scan module 1806 scans for unauthorized data based on information from one or more security policies stored in the policy database 1814 discussed further herein. The scan module 1806 may also be configured by an administrator, and administrator device (e.g., security administrator 325), and/or a user. In one example, the scan module 1806 receives a list of authorized data that the mobile device is authorized to access and the scan module 1806 identifies and/or removes all data not on the list. In another example, the scan module 1806 receives a list of unauthorized data that the mobile device is unauthorized to access or includes general categories (e.g., filters) which instructs the scan module 1806 to identify data as unauthorized any data that meets certain criteria. In one example, based on a filter, the scan module 1806 may scan data on the mobile device for words or phrases in file names and/or content of files to identify unauthorized content (e.g., adult content). The scan module 1806 may also scan for inappropriate network sites visited by the user by scanning the history of browsers, cookies, and/or temporary network files in cache.

If unauthorized data is found, the scan module 1806 may remove the unauthorized data (e.g., uninstall applications and/or delete files), quarantine unauthorized data, and/or generate a report regarding the found unauthorized data and any corrective action taken.

The scan module 1806 may also scan the mobile device and/or peripherals of the mobile device to determine if applications or files are stored on the mobile device. If one or more applications and/or files are not stored on the mobile device, the scan module 1806 may report the status of the mobile device or trigger applications or files to be downloaded from a network server and/or otherwise stored on the mobile device.

Those skilled in the art will appreciate that the scan module 1806 may be configured to provide a signal or report to an administrator or administrator device to trigger the mobile device to be re-imaged over a network. For example, a network administrator may maintain one or more images (including an OS, applications and data) for digital devices such as the mobile device that are coupled to a network. Upon a signal from the scan module 1806, the mobile device may be reimaged (either automatically based on the signal from the scan module 1806 or manually) with one or more images associated with the mobile device thereby replacing all or some of the stored data (including applications, operating system, and files) on the mobile device.

The update module 1808 is configured to update the mobile device. In some embodiments, the update module 1806 updates security applications on the mobile device (e.g., anti-virus programs, firewalls, antiphishing programs, and white filters, black filters), an operating system (e.g., update Microsoft Windows with available patches), drivers, and/or other applications. In one example, the update module 1808 may search for available updates for the mobile device, download the updates, and install the updates on the mobile device.

In some embodiments, an administrator device or another digital device may download selected updates that are to be available to the mobile device. For example, an administrator device may determine specific operating system patches are to be available to the mobile device but others should not be made available until testing on the patches are performed. The administrator device may download the approved updates to the mobile security system 1702 or, alternately, the scan module 1806 may contact the administrator device to determine if approved updates are available. Those skilled in the art will appreciate that there may be many ways to receive the updates for the mobile device.

In some embodiments, the update module 1808 provides a signal to the mobile device to trigger an application on the mobile device to determine if an update is available, download the update, and/or install the update. Those skilled in the art will appreciate that updating the mobile device may be performed by a variety of functions. For example, the update module 1808 may receive specific patches from the administrator server to be provided to the mobile device. Further, the update module 1808 may send an update signal to trigger an anti-virus application on the mobile device to search for available updates (e.g., virus definitions and program updates), download the updates if available, and install the downloaded updates, if any. The installation of one or more updates may be performed by the mobile security system 1702, the mobile device, or a combination of the two.

A maintenance module 1810 may be configured to perform maintenance on the mobile device and/or peripherals of the mobile device. Maintenance may include, but is not limited to, defragmenting the hard drive, deleting unneeded files (e.g., from the recycle bin, temporary files, cookies, and/or temporary files), and/or scanning a registry for errors.

In some embodiments, the maintenance module 1810 may be configured to trigger maintenance functions by the mobile device and/or peripherals of the mobile device. In one example, the maintenance module 1810 may provide a maintenance signal to the mobile device. In response to the maintenance signal, the mobile device may perform one or more maintenance functions (e.g., defragmentation, file deletion, or registry scan). Those skilled in the art will appreciate that the maintenance module 1810 may be configured to perform some functions on the mobile device and provide a maintenance signal to the mobile device so that the mobile device may perform other maintenance functions.

The maintenance module 1810 may also be configured to perform performance evaluations and take corrective action based on the performance evaluation. In one example, the maintenance module 1810 may be configured to run one or more tests to test the performance of the mobile device and/or peripherals of the mobile device. If the performance does not meet one or more predetermined thresholds, the maintenance module 1810 may analyze the results and/or perform testing to determine if corrective action can be taken. If corrective action can be taken automatically, the maintenance module 1810 may perform the corrective action. In one example, the maintenance module 1810 may determine that test performance was sluggish, and that one cause of the poor performance may be that there are too many files in cache. The maintenance module 1810 may then delete files in the cache. The maintenance module 1810 may then retest the mobile device, report the performance and corrective action, or take no further action. If corrective action may not be taken automatically, then the maintenance module 1810 may generate a report regarding the performance test and/or potential corrective action that may be taken.

Those skilled in the art will appreciate that the scan module 1806, the update module 1808, and the maintenance module 1810 may be configured to perform or not perform a variety of actions. In one example, a user of the mobile device or an administrator may configure the scan module 1806 to perform a quick scan of the mobile device, configure the update module 1808 to update the operating system, and configure the maintenance module 1810 to remove temporary files.

In some embodiments, a user or administrator may configure the mobile security system 1702 based on a calendar where one or more scans, updates, and maintenance functions are performed on different dates, after a predetermined period of time (e.g., every two weeks), and at different times. In one example, an administrator may configure the mobile security system 1702 such that a complete scan of the mobile device and peripherals occurs weekly at 2:00 AM on Monday morning, that defragmentation occurs one a month at 1:00 AM Saturday morning, and that virus updates are downloaded every time a wake event occurs. Those skilled in the art will appreciate that the mobile security system 1702 may be configured to perform any number of functions and/or trigger the performance of any number of functions at any time.

The optional power module 1812 may be configured to power the mobile security system 1702. In some embodiments, the power module 1812 receives power from the mobile device (e.g., via USB or other interface). The power module 1812 may also be configured to power the mobile security system 1702 when no power or limited power is received from the mobile device. In one example, the power module 1812 comprises a battery and/or capacitor.

Those skilled in the art will appreciate that the mobile device may power the mobile security system 1702 via an interface even while the mobile device is in a power management mode. In some embodiments, however, power to the mobile security system 1702 from the mobile device may be reduced or eliminated while the mobile device is in power management mode. The power module 1812 may continue to power the mobile security system 1702 and allow the mobile security system 1702 to perform the functions described herein.

In some embodiments, the power module 1812 monitors stored power (e.g., of a battery). If the mobile security system 1702 does not receive power from the mobile device while in power management mode, the power module 1812 may wake the mobile device from the power management mode when stored power is low, critically low, or below a predetermined threshold. Once the mobile device wakes from the power management mode, the mobile device may power the mobile security system 1702. The power module 1812 may keep the mobile device from entering the power management mode or continue to wake the mobile device from the power management mode until the stored power of the mobile security system 1702 is above a another predetermined threshold.

A policy database 1814 is any data structure configured to store one or more security policies. A security policy, as discussed herein, may further store instructions to configure the mobile security system 1702 and/or the components of the mobile security system 1702. In some embodiments, the security policy may configure the mobile security system 1702 to perform security functions at specified wake events when the mobile device is in a power management mode.

Those skilled in the art will appreciate that the mobile security system 1702 may comprise any number modules beyond those displayed in FIG. 18. For example, the mobile security system 1702 may comprise fewer modules than those displayed in FIG. 18. Alternately, the mobile device 1900 may comprise more components or modules than those displayed in FIG. 18.

Although FIG. 18 is discussed as communicating and interfacing with a mobile device, those skilled in the art will appreciate the mobile security system 1702 may communicate and interface with (e.g., provide wake signals and manage security services of) any digital device, not only those devices that are mobile.

Figure 19:
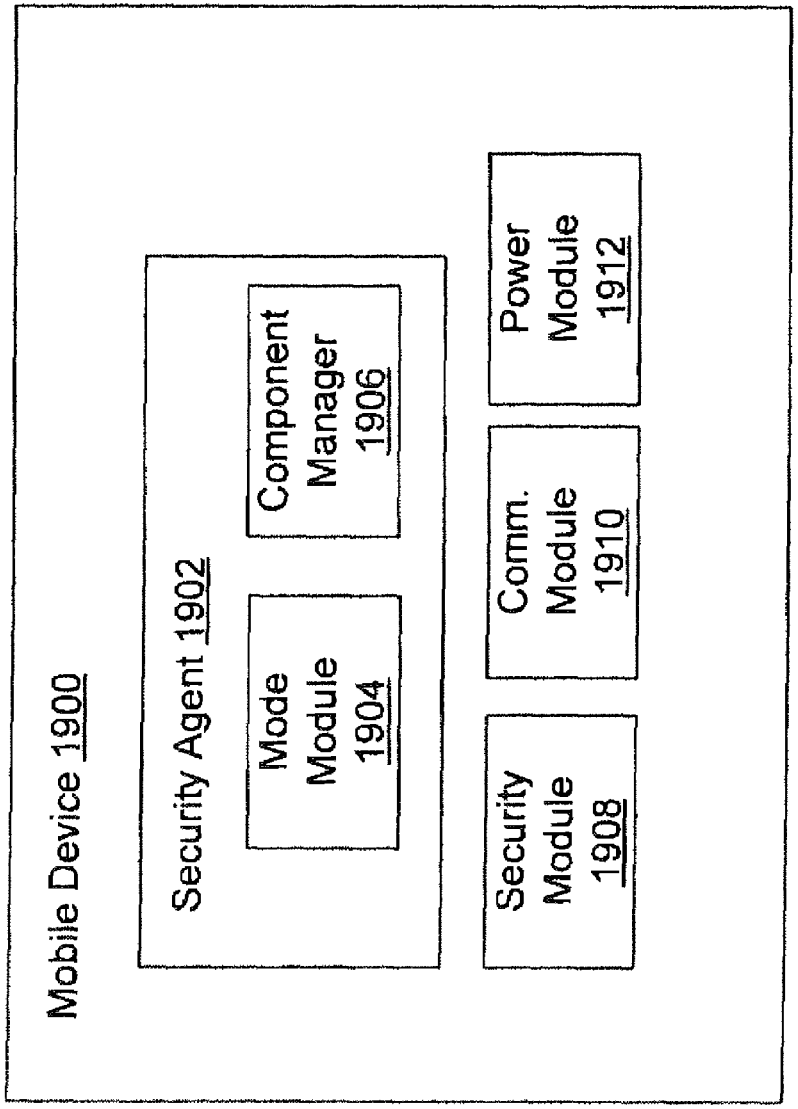
FIG. 19 is block diagram of a mobile device an embodiment of the present invention.

FIG. 19 is block diagram of a mobile device 1900 an embodiment of the present invention. In various embodiments, the mobile device 1900 is a laptop which enters into power management mode when the laptop lid is shut. The mobile security system 1702 may wake the mobile device 1900 or components of the mobile device 1900 upon the occurrence of wake event and perform security services even while the lid of the laptop remains shut. The mobile device 1900 comprises a security agent 1902, a security module 1908, a communication module 1910, and a power module 1912. The security agent 1902 comprises a mode manager 1904 and a component manager 1906.

The mobile device 1900 may be any digital device (e.g., a device with memory and a processor). The mobile device 1900, for example, may comprise a laptop, computer, server, personal digital assistant, smart phone, cell phone, media tablet, or net book.

The security agent 1902 is optional. In some embodiments, the security agent 1902 is installed by a user or administrator to communicate with the mobile security system 1702 and/or provide security services. The security agent 1902 may be configured to notify the mobile security system 1702 when the mobile device 1900 enters into a power management mode.

In various embodiments, the security agent 1902 comprises a mode module 1904 that is configured to wake one or more components of the mobile device 1900 from the power management mode without waking the entire mobile device 1900. In one example, the mobile security system 1702 provides a wake signal to the mode manager 1904 to wake the hard drive of the mobile device 1900. The security agent 1902 and/or the mobile security system 1702 may perform security services such as scanning, updating, performing maintenance, and taking corrective action. In some embodiments, after the security services are completed, the mobile security system 1702 and/or the security agent 1902 may put one or more components back to the power management mode.

The security agent 1902 may also comprise a component manager 1906 configured to allow the mobile security system 1702 to control or perform security services on one or more components of the mobile device 1900. In some embodiments, the mobile security system 1702 conducts security services on one or more components of the mobile device 1900 without waking the mobile device 1900 from the power management mode. When the security functions are completed, the control of the components may return to the mobile device 1900. In some embodiments, the component manager 1906 may interrupt security functions if the mobile device 1900 wakes from the power management mode. In another embodiments, the component manager 1906 only interrupts security functions upon input from a user (e.g., input is received from a mouse or keyboard or a laptop is opened).

The security module 1908 may comprise security applications (e.g., anti-virus applications and firewalls) as well as security data (e.g., anti-virus definitions, phishing filters, spam filters, and cookie filters). In various embodiments, the mobile security system 1702 may provide one or more signals to trigger various scans, updates, and maintenance functions by the security module 1908 rather than performing one or more security functions by the mobile security system 1702. Those skilled in the art will appreciate that the security module 1908 may perform some security functions based on input from the mobile security system 1702 and the mobile security system 1702 may perform other security functions.

Those skilled in the art will also appreciate that the security agent 1902 may be configured to perform one or more security services with or without a signal from the mobile security system 1702. In one example, the security agent 1902 may perform some security services (e.g., quick scan of RAM and the MBR as well as download and install new anti-virus definitions) upon termination of a power management mode or the waking of one or more components. In various embodiments, the security agent 1902 may be configured to perform one or more security functions without input or with only limited input from the mobile security system 1702. For example, the security agent 1902 may scan the mobile device 1900 at certain times and dates (e.g., recurring after a predetermined period of time) and update the mobile device 1900 at other times and dates. Those skilled in the art will appreciate that the security agent 1902 may perform any number of security functions at any time.

The communication module 1910 may be configured to communicate between the mobile device 1900 and the mobile security system 1702 and/or the a network coupled to the mobile device 1900. In various embodiments, the security agent 1902 communicates with the mobile security system 1702 only after communication is authenticated (e.g., via digital signature or password). In one example, communication between the mobile security system 1702 and the security agent 1902 is encrypted. The mobile security system 1702 and the security agent 1920 may comprise encryption keys such that communication is secured and authenticated before security services are performed, the mobile device 1900 is accessed, or control of one or more components of the mobile device 1900 are allowed.

The power module 1912 may control the power management mode of the mobile device 1900. In various embodiments, the power management mode is triggered by inactivity of the mobile device 1900 and/or lack of input from the user. In some embodiments, the power management module 1912 may trigger a power management mode when the mobile device 1900 is closed (e.g., when a laptop cover is closed). There may be many different power management modes which reduce or eliminate power to any number of components. Those skilled in the art will appreciate that the security services may be performed on one or more of the components of the mobile device 1900 and/or peripherals of the mobile device 1900 after the mobile device 1900 enters into any power management mode. The power module 1912 may also be configured to provide power to the mobile security system 1702 even during a power management mode.

Those skilled in the art will appreciate that the mobile device 1900 may comprise any number of components and modules beyond those displayed in FIG. 19. Further, those skilled in the art will appreciate that the mobile device 1900 may comprise fewer components or modules than those displayed in FIG. 19. Alternately, the mobile device 1900 may comprise more components or modules than those displayed in FIG. 19.

Figure 20:
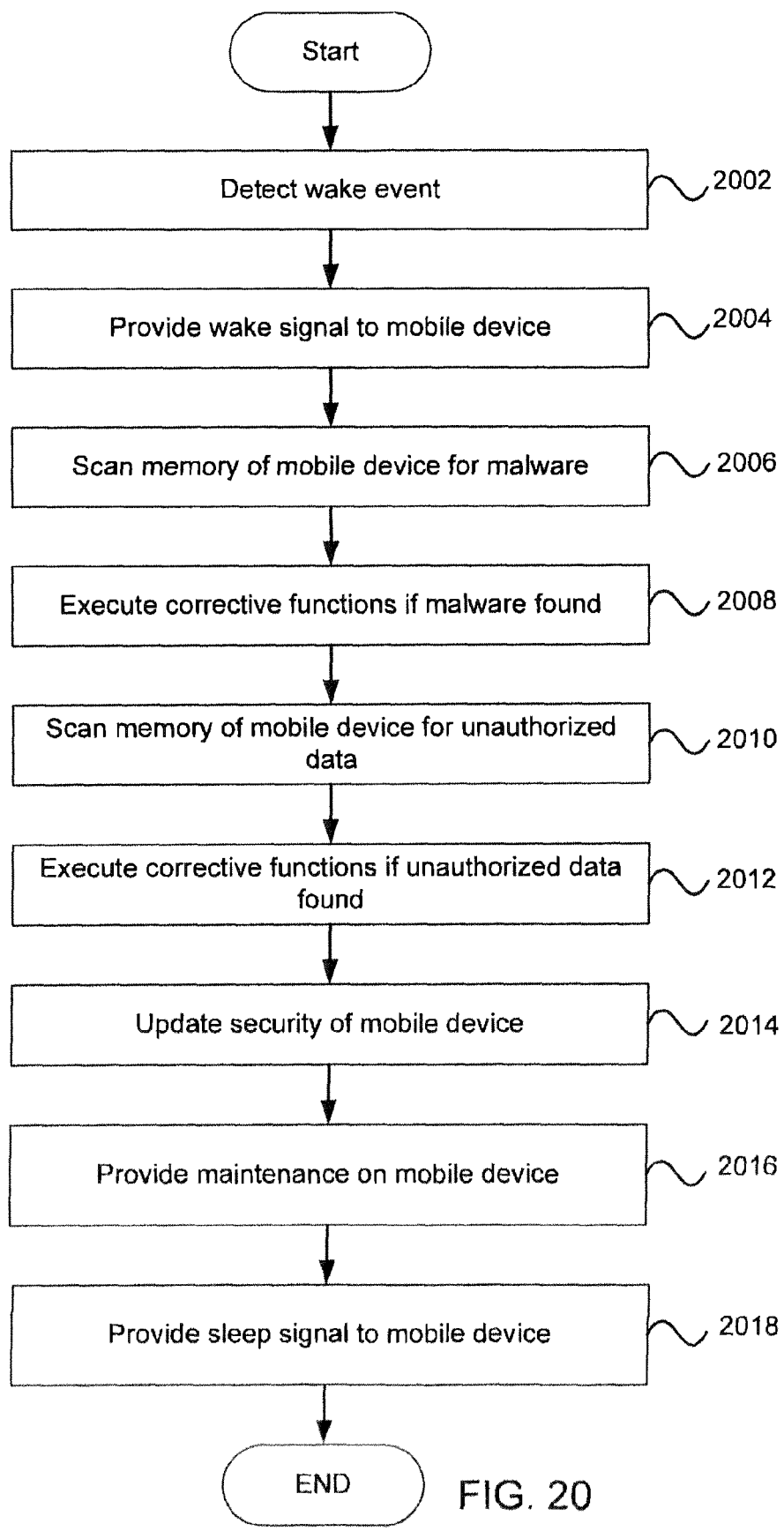
FIG. 20 is a flow chart for performing security functions on a mobile device in an embodiment of the present invention.

FIG. 20 is a flow chart for performing security functions on a mobile device 1900 in an embodiment of the present invention. In step 2002, the wake event module 1804 detects a wake event. In one example, the wake event module 1804 keeps track of time and checks if the mobile device 1900 is in a power management mode at specific times or intervals. If the mobile device 1900 is in a power management mode at the appointed time, a wake event is detected. In other embodiments, the security agent 1902 may indicate when the mobile device 1900 has entered a power management mode. The wake event module 1804 may detect a wake event if the mobile device 1900 has not terminated the power management mode after a predetermined period of time. In another embodiment, the wake event module 1804 may detect a wake event when the mobile security system 1702 receives an alarm or receive data from another digital device.

In step 2004, the wake module 1802 may provide a wake signal to the mobile device 1900. The wake module 1802 may provide the wake signal based on the detection of the wake event. In response to the wake signal, the mobile device 1900 may terminate the power management mode. The mobile security system 1702 may then perform security services and/or trigger security functions on the mobile device 1900. In other embodiments, in response to the wake signal, the mobile device 1900 may terminate the power management mode only for one or more components of the mobile device 1900 while leaving other components in the power management mode thereby allowing security functions to be performed on the components that are "awake."

In step 2006, the scan module 1806 performs one or more scans for malware on one or more components of the mobile device 1900 and/or on one or more peripherals of the mobile device 1900. In some embodiments, the scan module 1806 may trigger scans performed locally (e.g., by the security module 1908) on the mobile device 1900.

In step 2008, the scan module 1806 may execute corrective functions if malware is found. For example, the malware may be deleted, quarantined, overwritten, or otherwise removed. The scan module 1804 may generate a report or log information about the scan, malware, and/or any other corrective action taken. The scan module 1806 may also provide an alert to an administrator, administrator device, and/or the mobile device 1900.

In step 2010, the scan module 1806 may scan one or more components of the mobile device 1900 and one or more peripherals of the mobile device 1900 for unauthorized data. Unauthorized data may comprise applications and data that the user is not authorized to have loaded, stored, and/or installed on the mobile device 1900.

In step 2012, the scan module 1806 performs corrective functions if unauthorized data is found. For example, the unauthorized data may be deleted, quarantined, overwritten, or otherwise removed. The scan module 1804 may generate a report or log information about the scan, malware, and/or any other corrective action taken. The scan module 1806 may also provide an alert to an administrator, administrator device, and/or the mobile device 1900.

In step 2014, the update module 1808 may update various applications and data of the mobile device 1900. In some examples, the update module 1808 updates security applications, security files (e.g., anti-virus definitions), operating system, and driver files on the mobile device 1900. In some embodiments, the update module 1808 updates security applications and security definitions of the mobile security system 1702. The update module 1808 may update the mobile security system 1702 prior to the mobile security system 1702 performing scans and/or any other security functions on the mobile device 1900.

In step 2016, the maintenance module 1810 performs maintenance on the mobile device 1900. The maintenance module 1810 may be configured to provide a maintenance signal such that local applications on the mobile device 1900 perform one or more maintenance functions.

In optional step 2018, the wake module 1802 may provide a sleep signal to the mobile device 1900 to trigger a power management mode of the mobile device 1900, the peripherals of the mobile device 1900, and/or any components of the mobile device 1900.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

Further, the each term "comprising," "including," "having," "with," and "containing" is inclusive or open-ended and does not exclude additional, unrecited elements or method steps.

The invention claimed is:

1. A method comprising:
 detecting by a mobile security system processor of a mobile security system a wake event;
 providing from the mobile security system a wake signal to a mobile device, the mobile device having a mobile device processor different than the mobile security system processor, the wake signal being in response to the wake event and adapted to wake at least a portion of the mobile device from a power management mode; and
 after providing the wake signal to the mobile device, executing security instructions by the mobile security system processor to manage security services configured to protect the mobile device, the security instructions being stored on the mobile security system.

2. The method of claim 1, wherein the security services comprise scanning the hard drive of the mobile device for viruses.

3. The method of claim 1, wherein the security services comprise scanning the hard drive of the mobile device for malware.

4. The method of claim 1, wherein the security services comprise updating security applications on the mobile device.

5. The method of claim 1, wherein the security services comprise scanning the mobile device for unauthorized data.

6. The method of claim 5, wherein scanning the mobile device for unauthorized data comprises scanning the mobile device for unauthorized data based on a security policy.

7. The method of claim 1, wherein the wake event comprises an expiration of a predetermined period of time.

8. The method of claim 1, wherein the wake event comprises a specific time of day.

9. The method of claim 1, wherein the wake event comprises receiving data from a network.

10. A mobile security system, comprising:
a mobile security system processor;
a connection mechanism for connecting to a data port of a mobile device and for communicating with the mobile device;
security instructions; and
a security engine configured to:
- detect using the mobile security system processor a wake event;
- provide a wake signal to the mobile device, the mobile device having a mobile device processor different than the mobile security system processor, the wake signal being in response to the wake event and adapted to wake at least a portion of the mobile device from a power management mode; and
- after providing the wake signal to the mobile device, executing the security instructions using the mobile security system processor to manage security services configured to protect the mobile device.

11. The mobile security system of claim 10, wherein the security services comprise scanning the hard drive of the mobile device for viruses.

12. The mobile security system of claim 10, wherein the security services comprise scanning the hard drive of the mobile device for malware.

13. The mobile security system of claim 10, wherein the security services comprise updating security applications of the mobile device.

14. The mobile security system of claim 10, wherein the security services comprise scanning the mobile device for unauthorized data.

15. The mobile security system of claim 14, wherein scanning the mobile device for unauthorized data comprises scanning the mobile device for unauthorized data based on a security policy.

16. The mobile security system of claim 10, wherein the wake event comprises an expiration of a predetermined period of time.

17. The mobile security system of claim 10, wherein the wake event comprises a specific time of day.

18. The mobile security system of claim 10, wherein the wake event comprises receiving data from a network.

19. A non-transitory computer readable medium storing executable instructions, the instructions executable by a processor for performing a method, the method comprising:
- detecting by a mobile security system processor of a mobile security system a wake event;
- providing from the mobile security system a wake signal to a mobile device, the mobile device having a mobile device processor different than the mobile security system processor, the wake signal being in response to the wake event and adapted to wake at least a portion of the mobile device from a power management mode; and
- after providing the wake signal to the mobile device, executing security instructions by the mobile security system processor to manage security services configured to protect the mobile device, the security instructions being stored on the mobile security system.

20. The non-transitory computer readable medium of claim 19, wherein the method further comprises scanning the mobile device for unauthorized data.

* * * * *

(12) INTER PARTES REVIEW CERTIFICATE (3154th)

United States Patent
Oz et al.

(10) Number: US 8,631,488 K1
(45) Certificate Issued: Jun. 21, 2023

(54) SYSTEMS AND METHODS FOR PROVIDING SECURITY SERVICES DURING POWER MANAGEMENT MODE

(75) Inventors: Ami Oz; Shlomo Touboul

(73) Assignee: CUPP COMPUTING AS

Trial Number:
 IPR2019-00764 filed Mar. 1, 2019

Inter Partes Review Certificate for:
 Patent No.: 8,631,488
 Issued: Jan. 14, 2014
 Appl. No.: 12/535,650
 Filed: Aug. 4, 2009

The results of IPR2019-00764 are reflected in this inter partes review certificate under 35 U.S.C. 318(b).

INTER PARTES REVIEW CERTIFICATE
U.S. Patent 8,631,488 K1
Trial No. IPR2019-00764
Certificate Issued Jun. 21, 2023

AS A RESULT OF THE INTER PARTES REVIEW PROCEEDING, IT HAS BEEN DETERMINED THAT:

Claims 1-3, 5, 6, 9-12, 14, 15 and 18-20 are cancelled.

\* \* \* \* \*